US009975553B2

(12) United States Patent
Saji et al.

(10) Patent No.: US 9,975,553 B2
(45) Date of Patent: May 22, 2018

(54) AUTOMATIC TRANSMISSION

(71) Applicant: MAZDA MOTOR CORPORATION, Hiroshima (JP)

(72) Inventors: Koshiro Saji, Hiroshima (JP); Shinya Kamada, Kure (JP); Shotaro Nagai, Hiroshima (JP)

(73) Assignee: MAZDA MOTOR CORPORATION, Hirsoshima (JP)

( * ) Notice: Subject to any disclaimer, the term of this patent is extended or adjusted under 35 U.S.C. 154(b) by 460 days.

(21) Appl. No.: 14/774,008

(22) PCT Filed: Feb. 13, 2014

(86) PCT No.: PCT/JP2014/000732
§ 371 (c)(1),
(2) Date: Sep. 9, 2015

(87) PCT Pub. No.: WO2014/141590
PCT Pub. Date: Sep. 18, 2014

(65) Prior Publication Data
US 2016/0016587 A1 Jan. 21, 2016

(30) Foreign Application Priority Data

Mar. 12, 2013 (JP) .................................. 2013-049351

(51) Int. Cl.
*B60W 30/18* (2012.01)
*F16H 61/02* (2006.01)
(Continued)

(52) U.S. Cl.
CPC ...... *B60W 30/18054* (2013.01); *B60W 10/06* (2013.01); *B60W 10/115* (2013.01);
(Continued)

(58) Field of Classification Search
CPC ........... B60W 30/18054; B60W 10/06; B60W 10/10; B60W 10/11; B60W 10/111;
(Continued)

(56) References Cited

U.S. PATENT DOCUMENTS 8,758,197 B2 * 6/2014 Kamada ................ B60W 10/06
477/112
2006/0120888 A1 6/2006 Kitano et al.
(Continued)

FOREIGN PATENT DOCUMENTS

CN 1781790 A 6/2006
CN 101541612 A 9/2009
(Continued)

OTHER PUBLICATIONS

International Search Report for PCT/JP2014/000732 dated Apr. 28, 2014.
Written Opinion for PCT/JP2014/000732 dated Apr. 28, 2014.

*Primary Examiner* — Erin D Bishop
(74) *Attorney, Agent, or Firm* — Studebaker & Brackett PC

(57) ABSTRACT

An automatic transmission includes a first frictional engagement element (a low clutch 40), a second frictional engagement element (an L/R brake 60), two hydraulic chambers (a gap adjustment chamber 64 and a pressure chamber 65) provided in the second frictional engagement element, a first hydraulic pressure generator 101 (an electric pump 101) generating a hydraulic pressure during an automatic stop of the engine, and a control unit (a control unit 200) controlling the hydraulic pressure in the first and second frictional engagement elements. The control unit supplies the hydraulic pressure generated by the first hydraulic pressure generator to the first frictional engagement element and one of the two hydraulic chambers of the second frictional engage- (Continued)

ment element when the automatic transmission is in the non-traveling range and the engine has been automatically stopped.

21 Claims, 13 Drawing Sheets

(51) Int. Cl.
*F16H 61/00* (2006.01)
*B60W 10/06* (2006.01)
*B60W 10/115* (2012.01)
*F16H 3/66* (2006.01)

(52) U.S. Cl.
CPC ........... *F16H 3/66* (2013.01); *F16H 61/0031* (2013.01); *F16H 61/0206* (2013.01); *B60W 2510/06* (2013.01); *B60W 2510/1005* (2013.01); *B60W 2520/10* (2013.01); *B60W 2540/10* (2013.01); *B60W 2540/12* (2013.01); *B60W 2710/06* (2013.01); *B60W 2710/1005* (2013.01); *B60W 2710/1083* (2013.01); *F16H 2200/0052* (2013.01); *F16H 2200/201* (2013.01); *F16H 2200/2043* (2013.01); *F16H 2312/14* (2013.01)

(58) Field of Classification Search
CPC ............... B60W 10/113; B60W 10/115; F16H 61/0031; F16H 61/0204; F16H 61/0206; F16H 2312/14
See application file for complete search history.

(56) References Cited

U.S. PATENT DOCUMENTS

| | | |
|---|---|---|
| 2009/0232673 A1 | 9/2009 | Reisch et al. |
| 2010/0263951 A1 | 10/2010 | Hayashi et al. |
| 2011/0319227 A1 | 12/2011 | Kamada et al. |
| 2012/0138006 A1 | 6/2012 | Gwon et al. |

FOREIGN PATENT DOCUMENTS

| | | |
|---|---|---|
| CN | 102485565 A | 6/2012 |
| JP | H06-063937 U | 9/1994 |
| JP | 2005-265063 A | 9/2005 |
| JP | 2005-351426 A | 12/2005 |
| JP | 2011-247326 A | 12/2011 |
| JP | 2012-030779 A | 2/2012 |

\* cited by examiner

|  | LOW CLUTCH (40) | HIGH CLUTCH (50) | L/R BRAKE (60) | 2/6 BRAKE (70) | R/3/5 BRAKE (80) |
|---|---|---|---|---|---|
| FIRST GEAR | ENGAGED |  | ENGAGED |  |  |
| SECOND GEAR | ENGAGED |  |  | ENGAGED |  |
| THIRD GEAR | ENGAGED |  |  |  | ENGAGED |
| FOURTH GEAR | ENGAGED | ENGAGED |  |  |  |
| FIFTH GEAR |  | ENGAGED |  |  | ENGAGED |
| SIXTH GEAR |  | ENGAGED |  | ENGAGED |  |
| REVERSE GEAR |  |  | ENGAGED |  | ENGAGED |

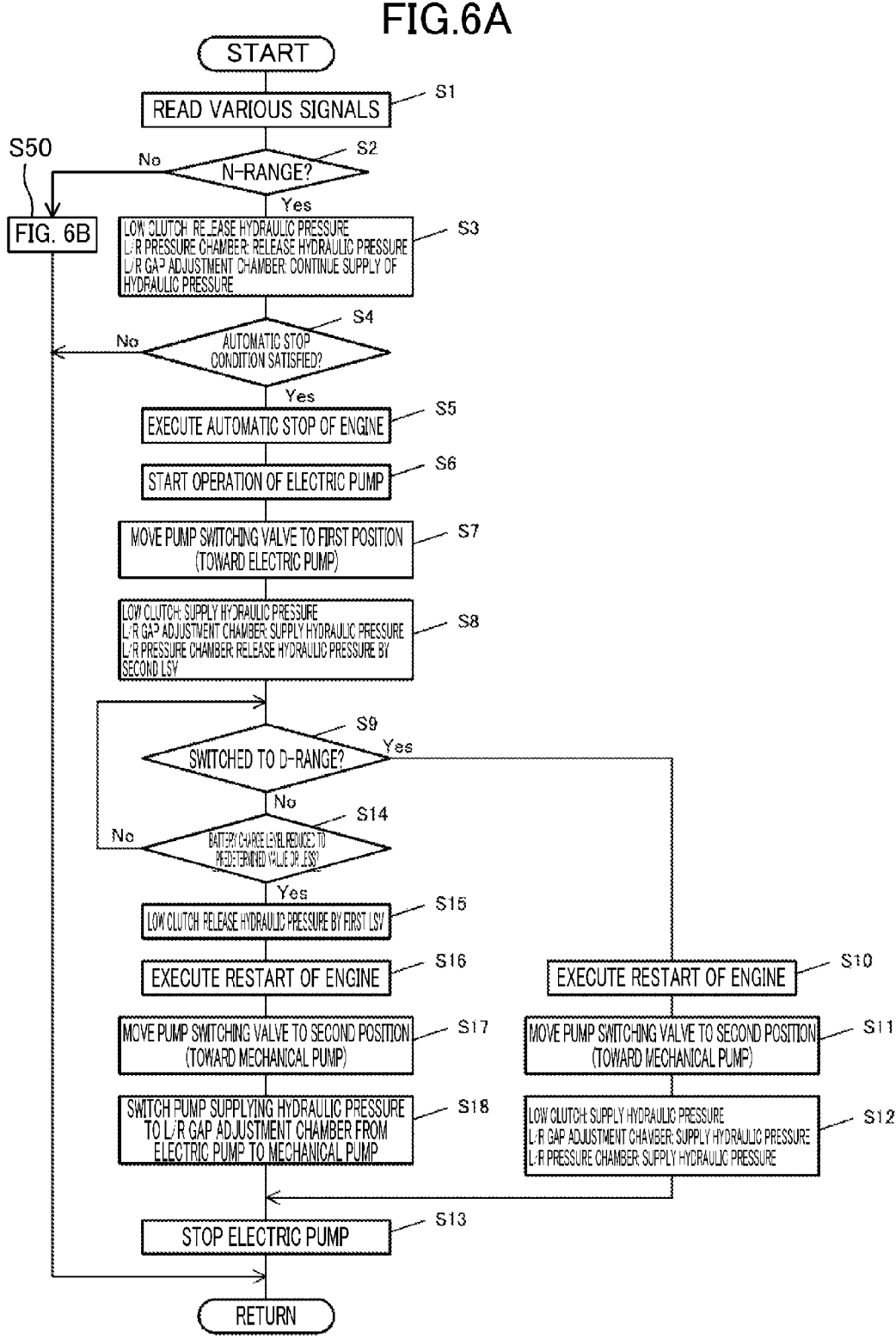

FIG.10

|  | D-RANGE ||| N-RANGE |||
| --- | --- | --- | --- | --- | --- | --- |
|  | LOW CLUTCH | L/R PRESSURE CHAMBER | L/R GAP ADJUSTMENT CHAMBER | LOW CLUTCH | L/R PRESSURE CHAMBER | L/R GAP ADJUSTMENT CHAMBER |
| DURING ENGINE OPERATION | ENGAGED | ENGAGED | ENGAGED | DISENGAGED | DISENGAGED OR ENGAGED | ENGAGED |
| DURING AUTOMATIC STOP OF ENGINE | ENGAGED | DISENGAGED | ENGAGED | ENGAGED | DISENGAGED | ENGAGED |

AUTOMATIC TRANSMISSION

TECHNICAL FIELD

The technique disclosed herein relates to an automatic transmission for a vehicle to which an idle stop control is applied to stop an engine automatically when the vehicle is stopped, and relates to a technical field of such an automatic transmission for vehicles.

BACKGROUND ART

In conventional automatic transmissions, one frictional engagement element and a one-way clutch are generally engaged to establish a starting gear position. However, such a one-way clutch is heavy, and may cause drag in gear positions except for the starting gear position. Accordingly, an attempt has been made to eliminate such a one-way clutch for, e.g., improving engine fuel consumption performance, and to engage two frictional engagement elements to establish the starting gear position.

Vehicles equipped with an idle stop control system have been commercially practical, in which an engine is automatically stopped when a predetermined stop condition is satisfied. Automatic transmissions mounted in such vehicles are provided with an electrically driven oil pump (hereinafter referred to as "electric pump") in addition to a mechanically driven oil pump (hereinafter referred to as "mechanical pump") driven by an engine to enable quick start of the vehicle in the next start. Supplying a hydraulic pressure generated by this electric pump allows for, even during an engine stop, advance engagement of start frictional engagement elements which transmit a motive force in starting the vehicle.

However, there may be a situation where a vehicle's operator allows an automatic transmission to switch from a traveling range such as D-range to a non-traveling range such as N-range before or after the engine is automatically stopped when the vehicle is stopped. In such a situation, an engagement hydraulic pressure is released from each of the frictional engagement elements in this automatic transmission. Thus, the start frictional engagement elements are not engaged even if the electric pump is driven while the engine is being automatically stopped. The start frictional engagement elements will be engaged again when a switch is made to the traveling range in starting the vehicle. At that time, however, the vehicle may possibly fail to start smoothly after a restart of the engine due to engagement delay of the frictional engagement elements.

In order to handle such a problem, Patent Document 1 discloses an automatic transmission including an electric pump which is operated when the engine has been automatically stopped. This automatic transmission is allowed to control supply of a hydraulic pressure generated by the electric pump to start frictional engagement elements even when a switch is made to a non-traveling range in the automatic transmission before or after an automatic stop of the engine, thereby allowing for engaging the start frictional engagement elements in advance in this non-traveling range just like in a traveling range. According to this configuration, when a switch is made to the traveling range in the automatic transmission in starting the vehicle, the vehicle can be started immediately after a restart of the engine. This configuration allows for a smooth start-up of the vehicle.

CITATION LIST

Patent Document

PATENT DOCUMENT 1: Japanese Unexamined Patent Publication No. 2012-30779

SUMMARY OF THE INVENTION

Technical Problem

In the idle stop control applied to stop an engine automatically during a vehicle stop, what is called "system restart" is performed to restart the engine automatically if, e.g., a battery charge level falls to be equal to or lower than a predetermined value, or a high power consumption device such as an air conditioner is activated. At that time, if the automatic transmission controls start frictional engagement elements to be engaged in the non-traveling range, the vehicle is erroneously started due to a restart of the engine against the will of the vehicle's operator.

If the engine is restarted when the automatic transmission is in the non-traveling range and the start frictional engagement elements are engaged, the electric pump is stopped, and the start frictional engagement elements are disengaged by releasing a hydraulic pressure supplied to the start frictional engagement elements by a hydraulic control valve, such as a solenoid valve, provided in a hydraulic passage where the hydraulic pressure is supplied to the start frictional engagement elements from the electric pump. However, if an open failure occurs in the hydraulic control valve (a failure where the valve is not operated while the hydraulic passage is in a communicating state), the hydraulic pressure is not immediately released from the electric pump. As a result, the engine is restarted with the start frictional engagement elements kept engaged. This results in the above-described erroneous start of the vehicle in the non-traveling range.

To address such a problem, Patent Document 1 discloses providing a pressure release circuit in a position upstream of the solenoid valve in the hydraulic passage which begins at the electric pump and ends at the start frictional engagement elements through the solenoid valve, the circuit being configured to partially release a hydraulic fluid from the hydraulic passage. This circuit is configured to release the hydraulic pressure supplied to the start frictional engagement elements by stopping the electric pump even if an open failure occurs in the solenoid valve. This configuration prevents, at the time of open failure of the solenoid valve, an erroneous start of the vehicle in the non-traveling range due to a restart of the engine with the start frictional engagement elements kept engaged.

However, if the above pressure release circuit is provided in the hydraulic passage which begins at the electric pump and ends at the start frictional engagement elements, the hydraulic fluid discharged from the pump is partially released from the pressure release circuit whenever the electric pump is operated. Therefore, the electric pump needs to increase its capacity in order to ensure the quantity of the operating hydraulic fluid or a hydraulic pressure necessary to engage the start frictional engagement elements during an engine stop.

In particular, in the above automatic transmission where a one-way clutch is eliminated and two frictional engagement elements are engaged for establishing a starting gear position, the size of the electric pump increases to allow for engaging the start frictional engagement elements during an engine stop. This results in an increase in weight of the vehicle, an increase in electric power consumption for driving the electric pump, or other unwanted events.

In view of the foregoing, the technique disclosed herein relates to an automatic transmission mounted in a vehicle to which idle stop control for an engine is applied, and allows this automatic transmission to ensure a smooth start of the vehicle after a switch is made from a non-traveling range to a traveling range in a situation where this automatic transmission allows a hydraulic pressure generated by an electric pump to engage start frictional engagement elements in the traveling range and the non-traveling range during an automatic stop of the engine. The technique disclosed herein also allows this automatic transmission to prevent an erroneous start of the vehicle in the non-traveling range at the time of open failure of a hydraulic control valve such as the solenoid valve without causing an increase in size of the electric pump and an increase in electric power consumption thereof.

Solution to the Problem

In order to solve the above problems, the technique disclosed herein relates to an automatic transmission mounted in a vehicle to which idle stop control for an engine is applied such that the engine is automatically stopped when a predetermined stop condition is satisfied, and the engine is automatically restarted when a predetermined restart condition is satisfied during the automatic stop of the engine, the automatic transmission switching between a traveling range and a non-traveling range in response to an operation of a vehicle's operator, the automatic transmission comprising: a first frictional engagement element and a second frictional engagement element engaged when the vehicle is started in the traveling range; two hydraulic chambers provided in the second frictional engagement element, and engaging the second frictional engagement element when a hydraulic pressure is supplied to the two hydraulic chambers; a first hydraulic pressure generator generating the hydraulic pressure when the engine has been automatically stopped; and a control unit controlling the hydraulic pressure in the first and second frictional engagement elements, wherein the control unit supplies the hydraulic pressure generated by the first hydraulic pressure generator to the first frictional engagement element and one of the two hydraulic chambers of the second frictional engagement element when the automatic transmission is in the non-traveling range and the engine has been automatically stopped.

The control unit supplies the hydraulic pressure generated by the first hydraulic pressure generator to the first frictional engagement element when the automatic transmission is in the non-traveling range and the engine has been automatically stopped. This allows for engagement of the first frictional engagement element. The control unit also supplies the hydraulic pressure generated by the first hydraulic pressure generator to one of the two hydraulic chambers of the second frictional engagement element. At that time, the second frictional engagement element is not engaged, but in, what is called, a prepared-for-engagement state. Accordingly, when a switch is made from the non-traveling range to the traveling range in this prepared-for-engagement state, supplying the hydraulic pressure to the other hydraulic chamber of the second frictional engagement element allows for engagement of the second frictional engagement element. The second frictional engagement element is engaged more quickly as compared with a case where this element turns to the engaged state from its completely disengaged state. This allows for a quick start of the vehicle after a restart of the engine.

On the other hand, when the automatic transmission is in the non-traveling range and the system of the engine is restarted due to, e.g., reduced battery charge level, the hydraulic pressure supplied to the first frictional engagement element is released, thereby disengaging the frictional engagement element. At that time, even if the first frictional engagement element cannot be disengaged, the automatic transmission is not in a starting gear position. That is because only one of the two hydraulic chambers of the second frictional engagement element is supplied with the hydraulic pressure, and the second frictional engagement element is not in the engagement state that allows transmission of a motive force. As a result, the vehicle is not erroneously started even if the engine is restarted.

This eliminates a conventional need for providing a pressure release circuit which partially releases an operating hydraulic fluid at any time to a hydraulic passage that allows the first frictional engagement element to communicate with the first hydraulic pressure generator (configured as an electric pump, for example) which is operated during an automatic stop of the engine. As a result, this reduces an increase in size of the electric pump and in electric power consumption, for example.

The second frictional engagement element may be engaged when the engine is operated in a reverse gear of the traveling range or in the non-traveling range, the control unit may release the hydraulic pressure from the first frictional engagement element and supplies the hydraulic pressure to the two hydraulic chambers of the second frictional engagement element when the transmission is in the non-traveling range and the engine automatically stopped is restarted, and the control unit may continuously supply the hydraulic pressure to one of the two hydraulic chambers of the second frictional engagement element in a situation where the control unit is unable to release the hydraulic pressure from the first frictional engagement element when the transmission is in the non-traveling range and the engine automatically stopped is restarted.

Suppose a situation where the vehicle that has traveled forward in the D-range is once stopped, and then travels backward. At that time, the range of the automatic transmission switches from the D-range to the N-range, and then switches to the R-range. That is, the range of the automatic transmission once switches from the traveling range to the non-traveling range, and then switches to the traveling range again. Since the second frictional engagement element is configured to be engaged at the time of both forward and backward travel of the vehicle in the traveling range, engaging the second frictional engagement element by the supply of the hydraulic pressure to both of the two hydraulic chambers thereof when the transmission is in the non-traveling range and the engine is operated allows for continuously engaging the second frictional engagement element when the range of the automatic transmission switches from the D-range to the N-range, and then, switches to the R-range in the above situation. This establishes the reverse gear position immediately after a switch is made to the R-range.

In the above configuration, when the transmission is in the non-traveling range and the engine automatically stopped is restarted, the hydraulic pressure is supplied to both of the two hydraulic chambers of the second frictional engagement element, whereas the hydraulic pressure in the first frictional engagement element is released to prevent an erroneous start of the vehicle. However, if the hydraulic pressure in the first frictional engagement element cannot be released, the hydraulic pressure is supplied to only one of the two hydraulic chambers of the second frictional engagement element. That is, of the hydraulic pressure to be supplied to both of the two hydraulic chambers, the hydraulic pressure is released from either one of the chambers. This does not allow for engaging the second frictional engagement element, thereby preventing an erroneous start of the vehicle in the non-traveling range.

The control unit may supply the hydraulic pressure generated by first hydraulic pressure generator to the first frictional engagement element and one of the two hydraulic chambers of the second frictional engagement element when the transmission is in the traveling range and the engine has been automatically stopped.

During an automatic stop of the engine, the hydraulic pressure is supplied to the first frictional engagement element and one of the two of the hydraulic chambers of the second frictional engagement element irrespective of whether the automatic transmission is in the traveling range or the non-traveling range. Therefore, even when a switch is made from the traveling range to the non-traveling range during the automatic stop of the engine, the second frictional engagement element is still in the prepared-for-engagement state.

The automatic transmission may further includes: a first hydraulic control valve having an input port, an output port, and a drain port; a first hydraulic passage provided so as to allow the first hydraulic pressure generator to communicate with the hydraulic chamber of the first frictional engagement element through the input port and the output port of the first hydraulic control valve, and capable of releasing the hydraulic pressure supplied to the hydraulic chamber from only the drain port of the first hydraulic control valve; and a second hydraulic passage allowing the first hydraulic pressure generator to communicate with one of the two hydraulic chambers of the second frictional engagement element.

When the automatic transmission is in the non-traveling range and the engine has been automatically stopped, supplying the first frictional engagement element with the hydraulic pressure generated by the first hydraulic pressure generator through the first hydraulic passage via the first hydraulic control valve allows for engaging the first frictional engagement element. Besides, the hydraulic pressure generated by the first hydraulic pressure generator is supplied to one of the two hydraulic chambers of the second frictional engagement element through the second hydraulic passage. As a result, the second frictional engagement element enters the prepared-for-engagement state.

On the other hand, when the automatic transmission is in the non-traveling range and the system of the engine is restarted due to, e.g., reduced battery charge level, communication between the output port and the drain port of the first hydraulic control valve allows for releasing the hydraulic pressure that has been supplied to the first frictional engagement element, thereby disengaging the first frictional engagement element. At that time, if an open failure occurs in the first hydraulic control valve, the first frictional engagement element may not be disengaged. However, even in such a case, the automatic transmission is not in the starting gear position and the vehicle is not erroneously started after a restart of the engine because the second frictional engagement element is in the prepared-for-engagement state.

This eliminates the conventional need for, in preparation for the open failure of hydraulic control valve, providing a pressure release circuit which partially releases an operating hydraulic fluid at any time into a hydraulic passage that allows the first frictional engagement element to communicate with the hydraulic pressure generator such as an electric pump which is operated during an automatic stop of the engine. As a result, this reduces an increase in size of the electric pump and in electric power consumption, for example.

The two hydraulic chambers of the second frictional engagement element may serve as a pressing hydraulic chamber pressing friction plates of the second frictional engagement element through a pressure piston when the two hydraulic chambers are supplied with the hydraulic pressure, and a gap adjustment hydraulic chamber reducing a gap between the pressure piston and the friction plates when the two hydraulic chambers are supplied with the hydraulic pressure, and the second hydraulic passage may allow the first hydraulic pressure generator to communicate with the gap adjustment hydraulic chamber.

The two hydraulic chambers in the second frictional engagement element serve as a pressing hydraulic chamber pressing friction plates of the second frictional engagement element through a pressure piston when the two hydraulic chambers are supplied with the hydraulic pressure, and a gap adjustment hydraulic chamber reducing a gap between the pressure piston and the friction plates when the two hydraulic chambers are supplied with the hydraulic pressure. The hydraulic pressure generated by the first hydraulic pressure generator is supplied to the gap adjustment hydraulic chamber through the second hydraulic passage. This allows the second frictional engagement element to enter the prepared-for-engagement state, i.e., the state where the second frictional engagement element is disengaged and there is a smaller gap between the pressure piston and the friction plates during an automatic stop of the engine in the non-traveling range.

Accordingly, at the time of occurrence of an open failure in the first hydraulic control valve, an erroneous start of the vehicle due to a restart of the engine in the non-traveling range is reliably prevented, whereas the second frictional engagement element is able to be engaged immediately after a switch is made to the traveling range.

The automatic transmission may further includes: a second hydraulic pressure generator driven by the engine and generating a hydraulic pressure; a third hydraulic passage allowing the second hydraulic pressure generator to communicate with the pressing hydraulic chamber of the second frictional engagement element; and a second hydraulic control valve provided in the third hydraulic passage, and capable of releasing the hydraulic pressure supplied to the pressing hydraulic chamber of the second frictional engagement element in a situation where the first hydraulic control valve becomes unable to release the hydraulic pressure supplied to the first frictional engagement element when the transmission is in the non-traveling range and the engine is restarted automatically.

When the automatic transmission is in the non-traveling range and the engine is restarted, the hydraulic pressure generated by the second hydraulic pressure generator is supplied to the pressure hydraulic chamber of the second frictional engagement element through the third hydraulic passage. This allows for engaging the second frictional engagement element. At that time, if the first frictional engagement element is not disengaged due to the open failure of the first hydraulic control valve, the vehicle would be erroneously started in the non-traveling range. However, the third hydraulic passage is provided with the second hydraulic control valve capable of releasing the hydraulic pressure supplied to the pressing hydraulic chamber of the second frictional engagement element if the first hydraulic control valve becomes unable to disengage the first frictional engagement element. The second hydraulic control valve thus allows for preventing engagement of the second frictional engagement element at the time of a restart of the engine. This thus prevents an erroneous start of the vehicle in the non-traveling range if an open failure occurs in the first hydraulic control valve.

The automatic transmission may further includes a third hydraulic control valve provided between the second hydraulic control valve in the third hydraulic passage and the pressing hydraulic chamber of the second frictional engagement element, and is able to switch between a first state where the second hydraulic control valve communicates with the pressure hydraulic chamber and a second state where there is no communication between the second hydraulic control valve and the pressure hydraulic chamber. The third hydraulic control valve may be configured to switch to the first state if the hydraulic pressure is supplied to the gap adjustment hydraulic chamber through the second hydraulic passage.

The third hydraulic control valve is provided between the second hydraulic control valve in the third hydraulic passage and the pressure hydraulic chamber of the second frictional engagement element. The third hydraulic control valve switches to the first state where the second hydraulic control valve communicates with the pressing hydraulic chamber if the hydraulic pressure is supplied to the gap adjustment hydraulic chamber through the second hydraulic passage. Thus, the hydraulic pressure is supplied to, and released from, the pressing hydraulic chamber by the second hydraulic control valve, in other words, the second frictional engagement element is engaged and disengaged with a smaller gap between the pressure piston and the friction plates.

This configuration, in which the third hydraulic control valve is provided, also allows for preventing an erroneous start of the vehicle in the non-traveling range reliably. That is because, if the first hydraulic control valve becomes unable to disengage the first frictional engagement element, the second hydraulic control valve is provided to allow for releasing the hydraulic pressure supplied to the pressure hydraulic chamber of the second frictional engagement element.

Advantages of the Invention

As can be seen from the foregoing description, the above automatic transmission allows for preventing an erroneous start of a vehicle in a non-traveling range.

BRIEF DESCRIPTION OF THE DRAWINGS

FIG. 6A is a part of a flowchart showing a first operation example of the engine and the automatic transmission when the engine is automatically stopped.

FIG. 10 is a table showing respective states where a hydraulic pressure is supplied to or released from a hydraulic chamber of a low clutch, and a pressure chamber and a gap adjustment chamber of an L/R brake.

DESCRIPTION OF EMBODIMENTS

Figures 1, 2:
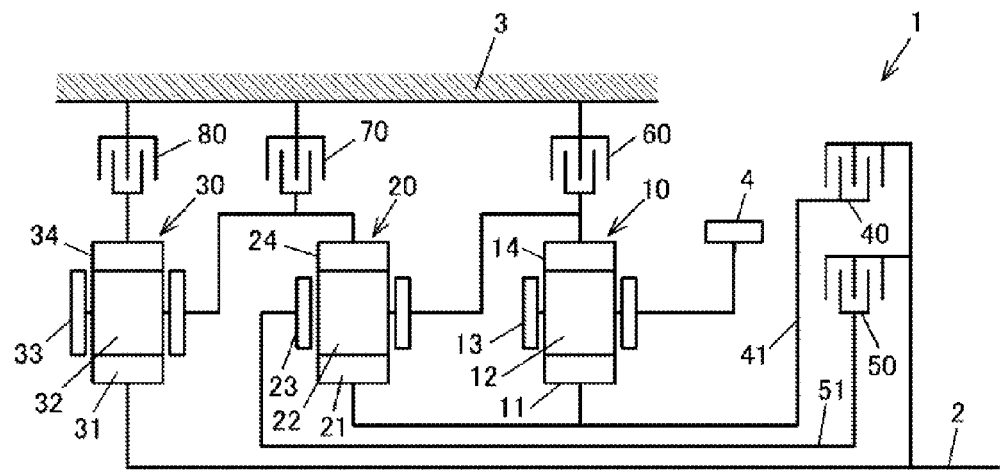
FIG. 1 is a schematic diagram showing a main part of an automatic transmission.
FIG. 2 is a table showing relationship between speed change gears and engagement combinations of frictional engagement elements.

Hereinafter, an embodiment will be described. FIG. 1 is a schematic diagram of the configuration of an automatic transmission according to the embodiment. This automatic transmission 1 includes: an input shaft 2 receiving an engine output through a torque converter (not shown); first, second, and third planetary gear sets (hereinafter referred to as simply "first, second, and third gear sets") 10, 20, and 30 disposed on the input shaft 2 in this order from a side adjacent to the engine (the right side of the figure); a low clutch 40 and a high clutch 50, as a hydraulic frictional engagement element for switching power transmission paths configured to, as the gear sets 10, 20, and 30, selectively transmitting a motive force from the input shaft 2 toward the gear sets 10, 20, and 30; a low reverse brake (hereinafter referred to as "L/R brake") 60; a second gear/sixth gear/ brake (hereinafter referred to as "2/6 brake") 70; and a reverse gear/third gear/fifth gear/brake (hereinafter referred to as "R/3/5 brake") 80. The L/R brake 60, the 2/6 brake 70, and the R/3/5 brake 80 is configured to fix predetermined rotation elements, namely, the respective gear sets 10, 20, and 30.

The gear sets 10, 20, and 30 are respectively comprised of sun gears 11, 21, and 31, pinions 12, 22, and 32 respectively engaged with the sun gears 11, 21, and 31, carriers 13, 23, and 33 respectively supporting the pinions 12, 22, and 32, and ring gears 14, 24, and 34 respectively engaged with the pinions 12, 22, and 32.

The sun gear 11 of the first gear set 10 and the sun gear 21 of the second gear set 20 are connected together to be coupled to an output member 41 of the low clutch 40. The carrier 23 of the second gear set 20 is connected to an output member 51 of the high clutch 50, and the sun gear 31 of the third gear set 30 is directly connected to the input shaft 2.

The ring gear 14 of the first gear set 10 and the carrier 23 of the second gear set 20 are connected together, and the L/R brake 60 is disposed between these elements and a transmission case 3. The ring gear 24 of the second gear set 20 and the carrier 33 of the third gear set 30 are connected together, and the 2/6 brake 70 is disposed between these elements and the transmission case 3. Furthermore, the R/3/5 brake 80 is disposed between the ring gear 34 of the third gear set 30 and the transmission case 3. An output gear 4 is connected to the carrier 13 of the first gear set 10, the output gear 4 outputting an output of the automatic transmission 1 to driving wheels (not shown).

According to the above configuration, through engagement combinations of the low clutch 40, the high clutch 50, the L/R brake 60, the 2/6 brake 70, and the R/3/5 brake 80, the automatic transmission 1 establishes the six gears in forward traveling ranges such as the D-range and the reverse gear of the reverse range, as shown in FIG. 2. As is clear in FIG. 2, in this embodiment, the low clutch 40 and the L/R brake 60 are implementation of first and second frictional engagement elements which will be engaged at the time of vehicle start.

The L/R brake 60 of the automatic transmission 1 according to this embodiment includes a double-acting hydraulic actuator having a gap adjustment function for improving response performance at the time of its engagement.

Figure 3A:
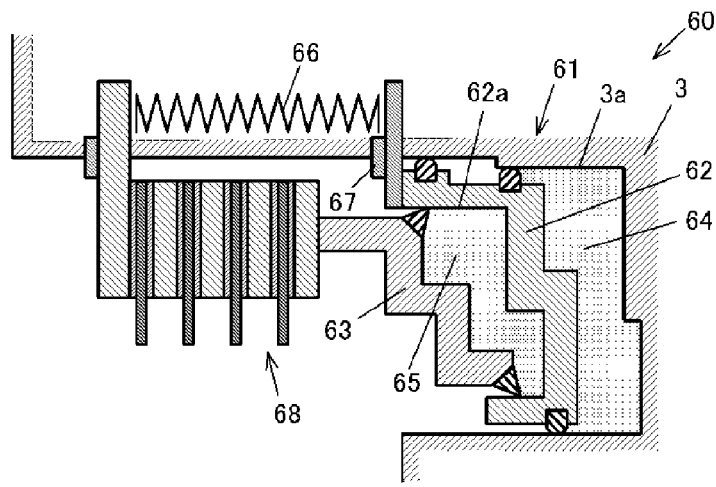
FIG. 3A is a view schematically illustrating a configuration of an L/R brake and an operation thereof.
Figure 3B:
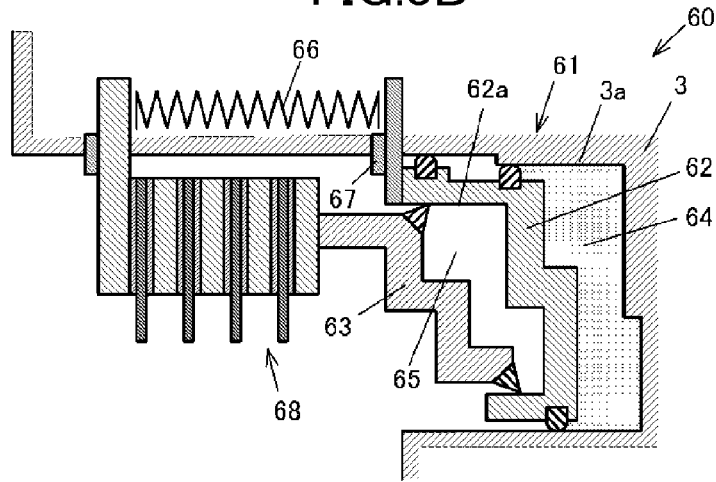
FIG. 3B is a view schematically illustrating a configuration of the L/R brake and an operation thereof.
Figure 3C:
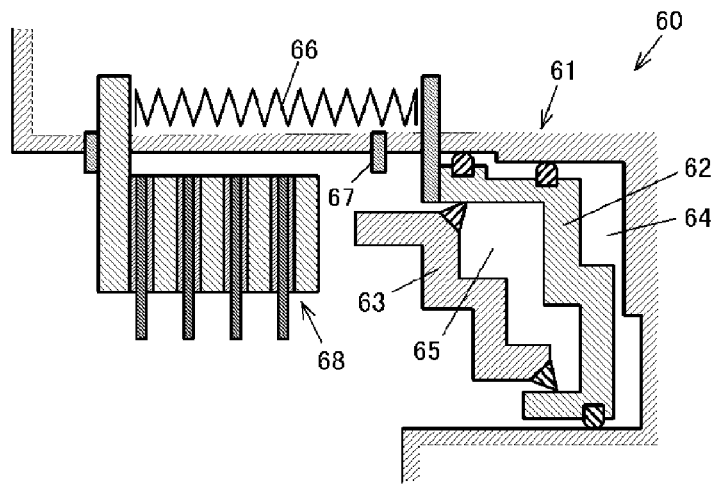
FIG. 3C is a view schematically illustrating a configuration of the L/R brake and an operation thereof.

Specifically, as illustrated in FIGS. 3A-3C, the hydraulic actuator 61 of the L/R brake 60 includes a gap adjustment piston 62 fitted in a cylinder 3a provided in the transmission case 3 and movable in the shaft direction, and a pressure piston 63 fitted in the gap adjustment piston 62 in a cylinder 62a provided inside the gap adjustment piston 62 and relatively movable in the shaft direction. A region behind the gap adjustment piston 62 in the cylinder 3a of the transmission case 3 is a hydraulic chamber 64 for gap adjustment (hereinafter referred to as a "gap adjustment chamber"), and a region behind the pressure piston 63 in the cylinder 62a of the gap adjustment piston 62 is a pressure chamber 65 for engagement of the L/R brake (hereinafter referred to as a "pressure chamber").

As illustrated in FIG. 3A, supplying the gap adjustment chamber 64 and the pressure chamber 65 with a hydraulic pressure allows the gap adjustment piston 62 to move toward the left side of the figure against the biasing force of a spring 66 to come into contact with a stopper 67. This supply also allows the pressure piston 63 to move toward the left side of the figure in the cylinder 62a of the gap adjustment piston 62 to press a plurality of friction plates 68 alternately engaged with the transmission case 3 and a rotation braked member (not shown). This allows for engaging the L/R brake 60.

As illustrated in FIG. 3B, releasing the hydraulic pressure from the pressure chamber 65 in this state allows releasing the pressing force of the pressure piston 63 to disengage the L/R brake 60 with the gap adjustment piston 62 and the pressure piston 63 remaining in the positions shown in FIG. 3A, i.e., the end of the pressure piston 63 kept in contact with the friction plates 68. In addition, releasing the hydraulic pressure also from the gap adjustment chamber 64 in this state allows the gap adjustment piston 62 to move toward the right side by the biasing force of the spring 66, as illustrated in FIG. 3C. At that time, the pressure piston 63 moves toward the right side together with the gap adjustment piston 62 by, e.g., friction of a sealing member, while maintaining the positional relationship with the gap adjustment piston 62.

In the next engagement of the L/R brake 60, the gap adjustment chamber 64 is first supplied with the hydraulic pressure, thereby allowing the gap adjustment piston 62 and the pressure piston 63 to move toward the left side while their positional relationship is maintained. Then, the movement of the pressure piston 63 for engagement is finished, and the end of the pressure piston 63 is in contact with, or substantially in contact with, the friction plates 68 without pressing the friction plates 68. As a result, the L/R brake 60 enters the prepared-for-engagement state.

Upon supply of the pressure chamber 65 with the hydraulic pressure in this state, the friction plates 68 are pressed substantially simultaneously with the supply, thereby establishing the engagement of the L/R brake 60 with improved response. This is because the movement of the pressure piston 63 for the engagement has already been finished.

The hydraulic pressure is supplied to the gap adjustment chamber 64 prior to the supply to the pressure chamber 65 whenever the L/R brake 60 is engaged in the state illustrated in FIG. 3C, whereas the hydraulic pressure is released from the pressure chamber 65 prior to the release from the gap adjustment chamber 64 whenever the L/R brake 60 is disengaged in the state illustrated in FIG. 3A. In other words, the hydraulic pressure is supplied to, and released from, the pressure chamber 65 in a state where the hydraulic pressure is supplied to the gap adjustment chamber 64 illustrated in FIG. 3B and the gap adjustment piston 62 moves toward the engagement side. In order to implement such a configuration, an L/R shift valve 107 (see FIG. 4) is included in a hydraulic circuit that will be described later.

The automatic transmission 1 includes this hydraulic circuit for establishing the various speed change gears by selectively supplying the respective frictional engagement elements 40-80 with the hydraulic pressure. Next, with reference to FIG. 4, a configuration of a part of this hydraulic circuit 100 will be described which relates to hydraulic pressurecontrol during an idle stop of the engine, specifically, which controls the supply of the hydraulic pressure to the low clutch 40 and the L/R brake 60 that are engaged at the time of vehicle start.

Figure 4:
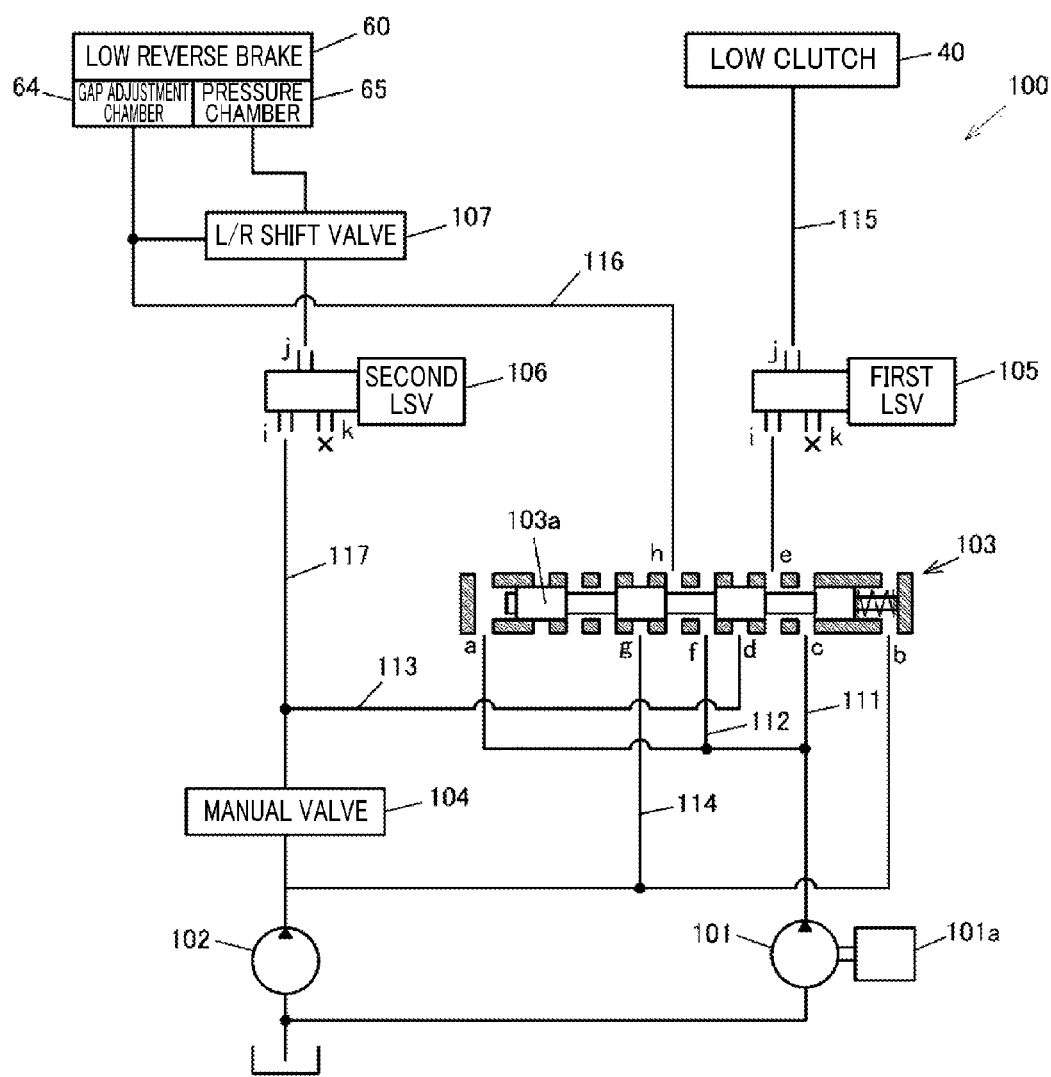
FIG. 4 is a circuit diagram illustrating the configuration of a main part of a hydraulic circuit.

As illustrated in FIG. 4, the hydraulic circuit 100 is configured to receive the hydraulic pressure generated by the electric pump (i.e., a "first hydraulic pressure generator") 101 driven by a motor 101a during the engine stop, and the hydraulic pressure generated by the mechanical pump (i.e., a "second hydraulic pressure generator") 102 driven by the engine.

The hydraulic circuit 100 includes, as valves for supplying the low clutch 40 and the L/R brake 60 with the hydraulic pressures supplied from the pumps 101 and 102, a pump switching valve 103, a manual valve 104, a first linear solenoid valve (i.e., a "first hydraulic control valve," hereinafter referred to as a "first LSV") 105, a second linear solenoid valve (i.e., a "second hydraulic control valve," hereinafter referred to as a "second LSV") 106, and the L/R shift valve 107. The pump switching valve 103 switches supply destinations of the hydraulic pressure generated by the electric pump 101 or the mechanical pump 102 between the low clutch 40 and the L/R brake 60. The manual valve 104 links with the range operation by the vehicle's operator. The first LSV 105 controls the hydraulic pressure supplied to the low clutch 40, and the second LSV 106 controls the hydraulic pressure supplied to the L/R brake 60. The L/R shift valve 107 regulates the order of the supply and release of the hydraulic pressure to and from the gap adjustment chamber 64 and the pressure chamber 65 in the L/R brake 60 as stated above.

The pump switching valve 103 includes, at both ends, a first switching port a and a second switch port b each switching positions of a spool 103a. When the electric pump 101 is operated, the hydraulic pressure is introduced from the electric pump 101 into the first switch port a in the left side of the figure, thereby allowing the spool 103a to be in a first position, i.e., the right side (the position illustrated in the figure). When the mechanical pump 102 is operated, the hydraulic pressure is introduced from the mechanical pump 102 into the second switch port b in the right side of the figure, thereby allowing the spool 103a to be in a second position, i.e., the left side.

The pump switching valve 103 also includes first and second input ports c and d, and an output port e which are provided for the low clutch, and first and second input ports f and g, and an output port h which are provided for the L/R brake. When the spool 103a is in the first position, the first input port c for the low clutch communicates with the output port e for the low clutch, and the first input port f for the L/R brake communicates with the output port h for the L/R brake, as illustrated in the figure. Although not shown, when the spool 103a is in the second position, the second input port d for the low clutch communicates with the output port e for the low clutch, and the second input port g for the L/R brake communicates with the output port h for the L/R brake.

The first input port c for the low clutch is connected to a first input line (i.e., an upstream portion of a "first hydraulic passage") 111 introduced from the electric pump 101, and the first input port f for the L/R brake is connected to a second input line (i.e., an upstream portion of a "second hydraulic passage") 112 introduced from the electric pump 101. The second input port d for the low clutch is connected to a third input line 113 introduced from the mechanical pump 102 through the manual valve 104, and the second input port g for the L/R brake is connected to a fourth input line 114 introduced directly from the mechanical pump 102.

The output port e for the low clutch of the pump switching valve 103 is introduced into a hydraulic chamber of the low clutch 40 by a low clutch line (i.e., a downstream portion of the "first hydraulic passage") 115 through the first LSV 105. The output port h for the L/R brake is introduced into the gap adjustment chamber 64 of the L/R brake 60 by a gap adjustment line (i.e., a downstream portion of the "second hydraulic passage") 116.

Furthermore, a pressure line (i.e., a "third hydraulic passage") 117 branching from the third input line 113 in a position downstream of the manual valve 104 is introduced into the pressure chamber 65 of the L/R brake 60 through the second LSV 106 and the L/R shift valve 107.

This L/R shift valve 107 is configured to be supplied with a hydraulic pressure from the gap adjustment line 116 as a switching pressure. When this hydraulic pressure is supplied, i.e., a hydraulic pressure is supplied to the gap adjustment chamber 64 of the L/R brake 60, the second LSV 106 of the pressure line 117 communicates with the pressure chamber 65.

The manual valve 104 is configured to allow the mechanical pump 102 to communicate with the third input line 113 and the pressure line 117, which are located downstream of the manual valve 104 at the time of the D-range operation, and to allow these lines 113 and 117 to be drained at the time of the N-range operation.

Each of the first and second LSVs 105 and 106 has an upstream input port i, a downstream output port j, and a downstream drain port k. These ports are configured such that the input port i communicates with the output port j when the valve is opened, whereas the port i does not communicate with the port j and the downstream output port j communicates with the drain port k when the valve is closed.

Such a configuration of the automatic transmission 1 according to this embodiment allows for controlling engagement of the low clutch 40 and the L/R brake 60 in association with the idle stop control of the engine. The automatic transmission 1 includes a control unit 200 for such control.

Figure 5:
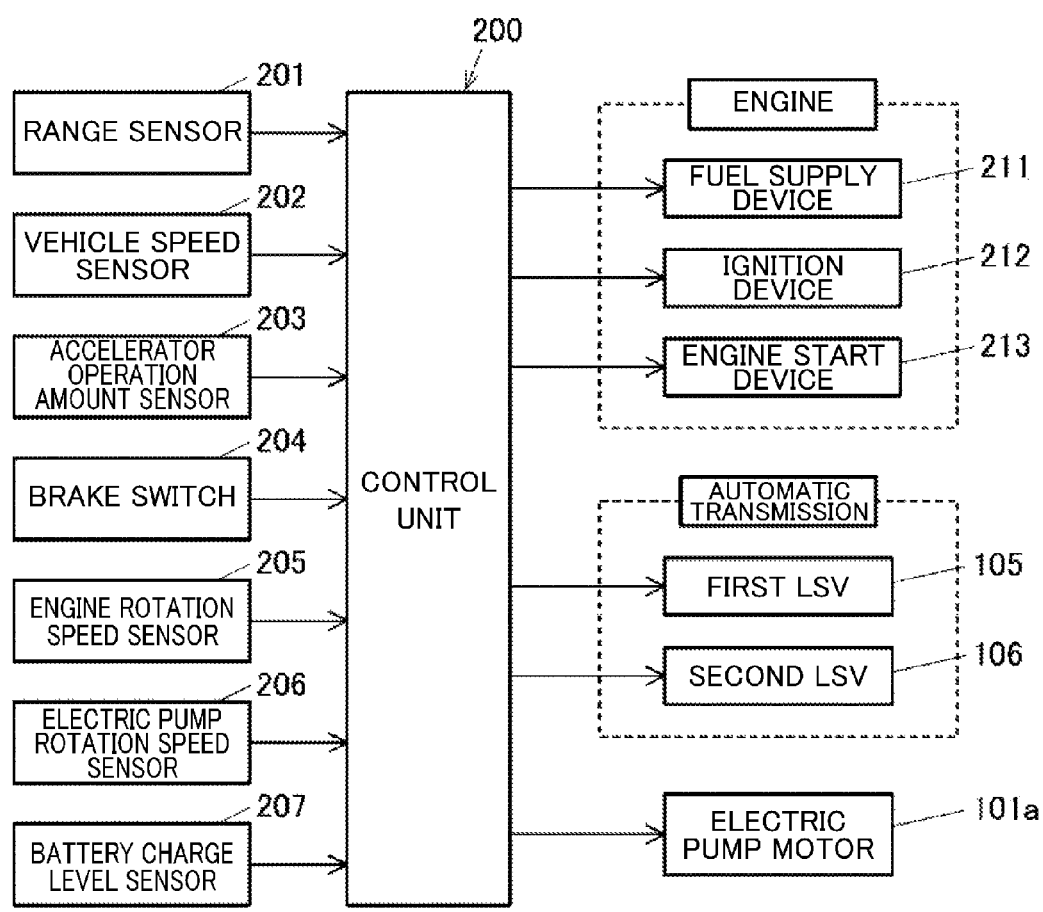
FIG. 5 is a block diagram showing a control system of an engine and an automatic transmission.

As illustrated in FIG. 5, the control unit 200 is configured to receive, for example, a signal from a range sensor 201 detecting the range of the automatic transmission 1 selected by the operation of the vehicle's operator, a signal from a vehicle speed sensor 202 detecting the vehicle speed of the vehicle, a signal from an accelerator operation amount sensor 203 detecting an operation amount of the accelerator pedal of the vehicle's operator, a signal from a brake switch 204 detecting stepping on the brake pedal, a signal from an engine rotation speed sensor 205 detecting the rotation speed of the engine, a signal from an electric pump rotation speed sensor 206 detecting the rotation speed of the electric pump 101, and a signal from a battery charge level sensor 207 detecting the battery charge level.

Based on these signals, the control unit 200 is configured to output signals for an automatic stop or an automatic restart to a fuel supply device 211, an ignition device 212, an engine start device 213 of the engine to perform idle stop control of the engine. The control unit 200 is also configured to output control signals for engagement control of the low clutch 40 and the L/R brake 60 of the automatic transmission to the first and second LSVs 105 and 106, and to output a signal for instruction of the operation of a motor 101a of the electric pump 101.

Next, a first operation example in this embodiment including a control operation by the control unit 200 will be described in accordance with flowcharts of FIGS. 6A and 6B, and timing charts of FIGS. 7A and 7B.

Figure 6B:
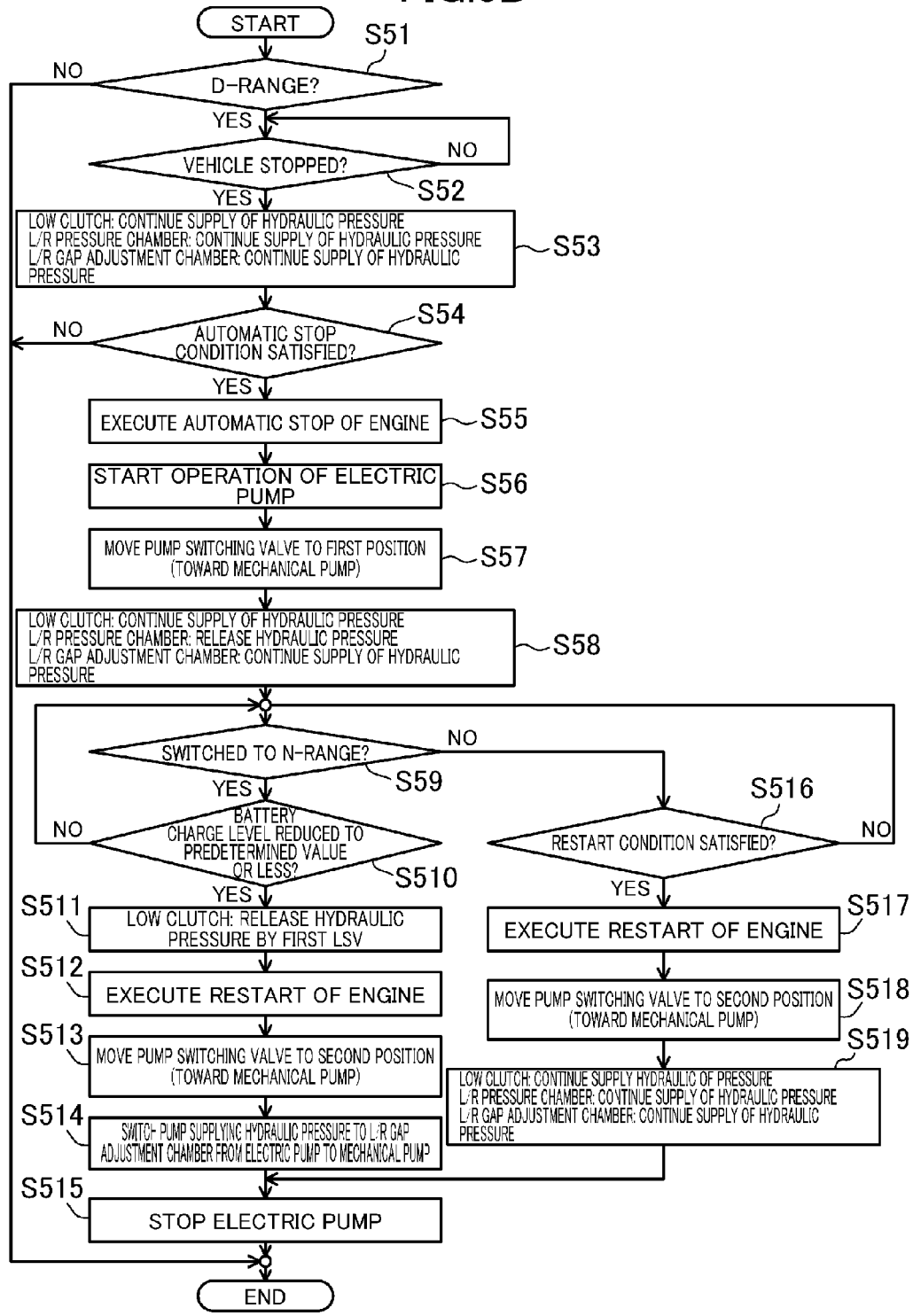
FIG. 6B is another part of the flowchart showing the first operation example of the engine and the automatic transmission when the engine is automatically stopped.
Figure 7A:
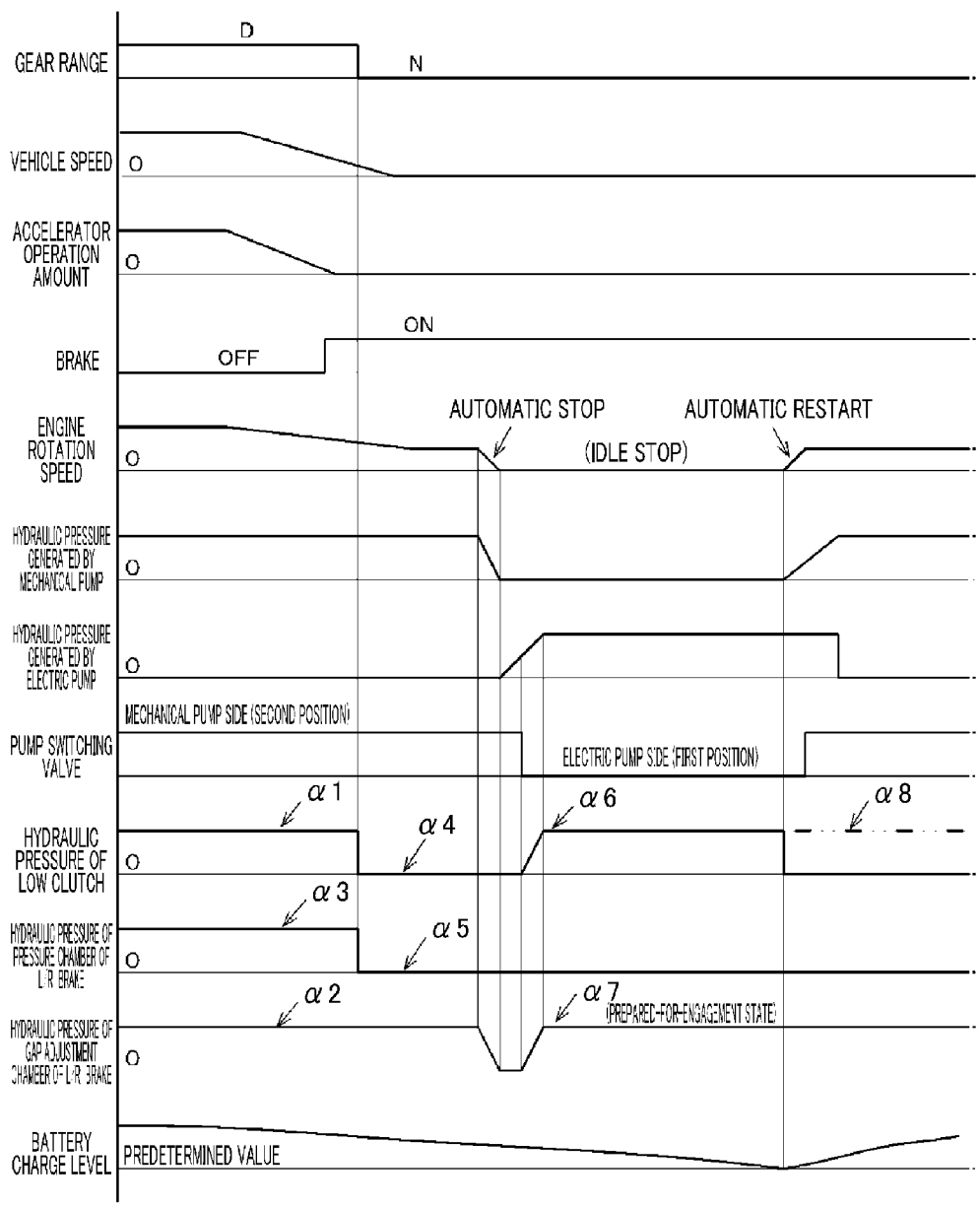
FIG. 7A is a timing chart showing the first operation example.
Figure 7B:
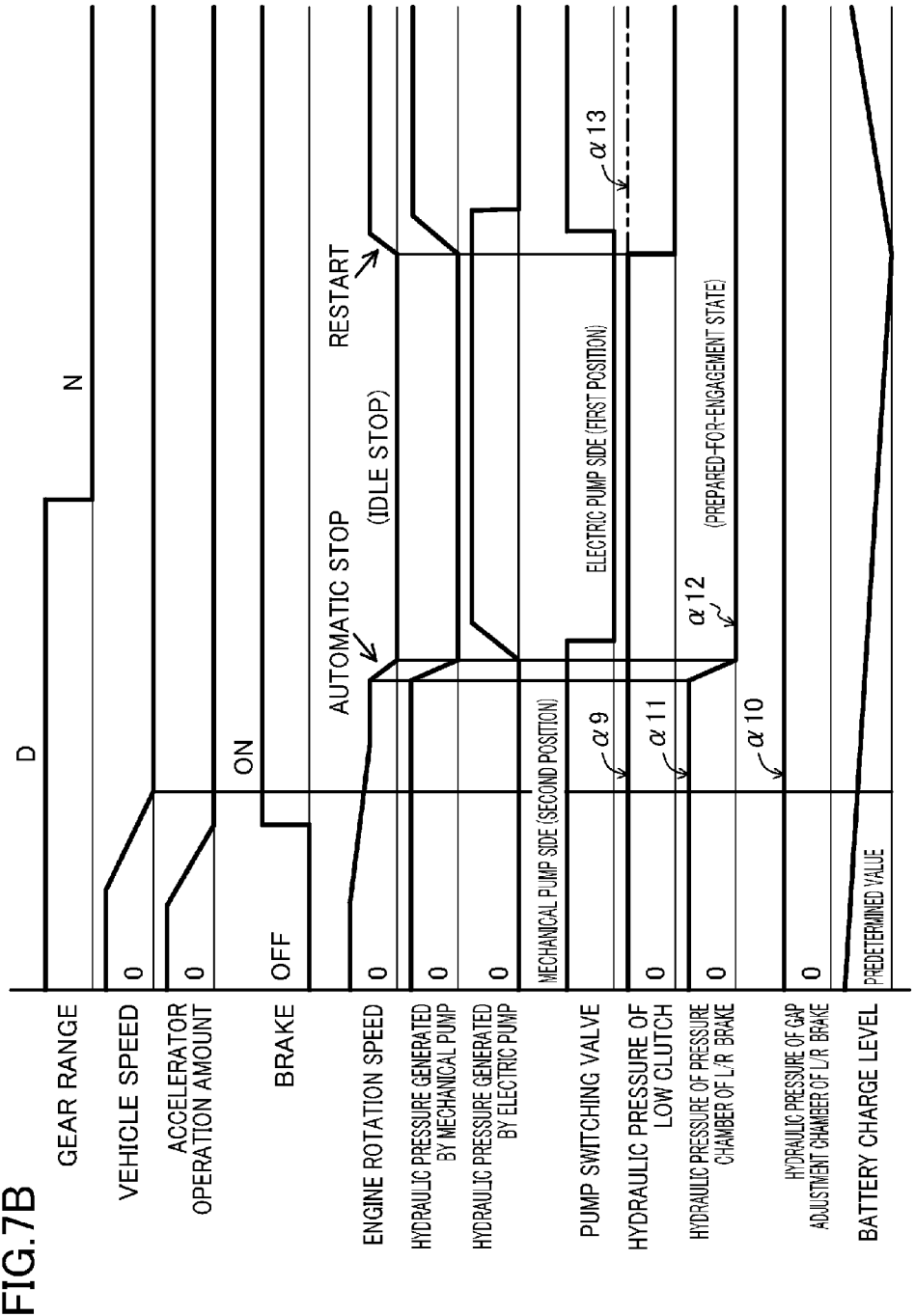
FIG. 7B is another timing chart showing the first operation example.

The flowcharts of FIGS. 6A and 6B show an operation when the vehicle transitions from the traveling state to the stopping state. In Step S1, various signals are first input from the switch and the sensors 201-207. In Step S2, a determination is made whether or not the current range of the automatic transmission 1 is the N-range.

When the vehicle is being stopped, the automatic transmission 1 is in the D-range. When the engine is not automatically stopped yet, the spool 103a of the pump switching valve 103 in the hydraulic circuit 100 of FIG. 4 is in the second position (the left side), and the hydraulic pressure generated by the mechanical pump 102 driven by the engine is supplied to the hydraulic chamber of the low clutch 40 through the manual valve 104, the third input line 113, the pump switching valve 103, the low clutch line 115, and the first LSV 105. This allows for engaging the clutch 40 (see the reference character α1 of FIG. 7A).

The hydraulic pressure generated by the mechanical pump 102 is supplied to the gap adjustment chamber 64 of the L/R brake 60 through the fourth input line 114, the pump switching valve 103, and the gap adjustment line 116, and is also supplied to the pressure chamber 65 of the L/R brake 60 through the pressure line 117 branching from the third input line 113, the second LSV 106, and the L/R shift valve 107. This allows for engaging the L/R brake 60 (reference characters α2 and α3).

If the automatic transmission 1 is still in the D-range in this state, the process jumps from Step S2 in FIG. 6A to Step S50. The control in Step S50 will be described later. On the other hand, if the range of automatic transmission 1 switches to the N-range, the process proceeds from Step S2 to Step S3. Specifically, the spool of the manual valve 104 moves to the N position, and the third input line 113 and the pressure line 117 are drained. This allows for releasing the hydraulic pressure from the hydraulic chamber of the low clutch 40 and the pressure chamber 65 of the L/R brake 60, thereby disengaging the low clutch 40 and the L/R brake 60 (reference characters α4 and α5).

At that time, the second LSV 106 also releases the hydraulic pressure from the pressure chamber 65 of the L/R brake 60. On the other hand, the hydraulic pressure is continuously supplied to the gap adjustment chamber 64 of the L/R brake 60 because the gap adjustment chamber 64 communicates directly with the mechanical pump 102.

Furthermore, in Step S4, a determination is made whether or not a condition for an automatic stop of the engine is satisfied based on, e.g., the vehicle speed, and conditions of the brake and the accelerator. If a predetermined automatic stop condition is satisfied, the control unit 200 outputs a signal for stopping the engine to, e.g., the fuel supply device 211 and the ignition device 212 of the engine. Then, in Step S5, the engine is automatically stopped, i.e., in the idle stop state.

At that time, the mechanical pump 102 is stopped. In Step S6, the motor 101a of the electric pump 101 receives an operation signal and the electric pump 101 starts its operation. In Step S7, switching the operating pumps allows the spool 103a of the pump switching valve 103 to move to the first position (right side), thereby making a transition to a state shown in Step S8. Specifically, in this state, the hydraulic pressure generated by the electric pump 101 is supplied to the hydraulic chamber of the low clutch 40 through the first input line 111, the pump switching valve 103, the low clutch line 115, and the first LSV 105, and is also supplied to the gap adjustment chamber 64 of the L/R brake 60 through the second input line 112, the pump switching valve 103, and the gap adjustment line 116.

This allows for engaging the low clutch 40 again, and causes an increase in the hydraulic pressure in the gap adjustment chamber 64 that once reduced at the time of stop of the mechanical pump 102 (reference characters α6 and α7). At that time, in the L/R brake 60, the hydraulic pressure is supplied to the gap adjustment chamber 64 whereas the hydraulic pressure is released from the pressure chamber 65 by the second LSV 106. Therefore, the L/R brake 60 is in the prepared-for-engagement state illustrated in FIG. 3B where the gap adjustment piston 62 and the pressure piston 63 move toward the left side of the figure with their positional relationship maintained, and the end of the pressure piston 63 is in contact with, or substantially in contact with, the friction plates 68 without pressing the friction plates 68.

Next, in Step S9, a determination is made whether or not the automatic transmission 1 has switched from the N-range to the D-range. If this switch has been made, the engine is automatically restarted according to Steps S10-S12. Besides, the spool 103a of the pump switching valve 103 moves to the second position again, and the hydraulic pressure generated by the mechanical pump 102 that has started its operation is supplied to the hydraulic chamber of the low clutch 40, and the gap adjustment chamber 64 and the pressure chamber 65 of the L/R brake 60. At this time, in Step S13, the electric pump 101 is stopped.

In this manner, the hydraulic pressure generated by the mechanical pump 102 allows for engaging the low clutch 40 and the L/R brake 60, and thus the vehicle is ready to start in the first gear position. Since the L/R brake 60 has been in the prepared-for-engagement state in advance as stated above, they are engaged simultaneously with the supply of the hydraulic pressure to the pressure chamber 65. Accordingly, when a switch is made to the D-range, a smooth start-up of the vehicle can be obtained.

On the other hand, before the automatic transmission 1 is switched to the D-range, a determination is made whether or not the battery charge level is reduced to the predetermined value or less in Step S14. If it is reduced to the predetermined value or less, i.e., the system of the engine is restarted, the first LSV 105 releases the hydraulic pressure supplied to the hydraulic chamber of the low clutch 40 through the low clutch line 115 in Step S15. Then, the engine is automatically restarted in Step S16. Accordingly, the engine is restarted with the low clutch 40 disengaged. The vehicle is not erroneously started with the automatic transmission 1 in the N-range.

Thereafter, the spool 103a of the pump switching valve 103 again moves to the second position in Steps S17 and S18 in association with the restart of the engine, and the pump supplying the hydraulic pressure to the gap adjustment chamber 64 of the L/R brake 60 is switched from the electric pump 101 to the mechanical pump 102. Then, the electric pump 101 is stopped in Step S13.

If the first LSV 105 releases the hydraulic pressure supplied to the hydraulic chamber of the low clutch 40 in Step S15, the first LSV 105 may become inoperable with the input port i and the output port j communicating with each other due to the open failure of the first LSV 105. In such a situation, the hydraulic pressure supplied to the hydraulic chamber of the low clutch 40 cannot be released from the drain port k of the first LSV 105, and the low clutch 40 cannot be disengaged (the reference character α8).

Accordingly, if the L/R brake 60 were also engaged, the vehicle would be erroneously started in the N-range at the time of restart of the system of the engine in Step S16. However, the L/R brake 60 is maintained in the above-described prepared-for-engagement state, i.e., the state where the pressure piston 63 is in contact with the friction plates 68 without pressing the friction plates 68. This does not allow the power transmission path of the automatic transmission 1 to be in the first gear position even if the low clutch 40 is not disengaged due to the open failure of the first LSV 105. Thus, the vehicle is not started even if the engine is started.

In this case, the prepared-for-engagement state of the L/R brake 60 prevents an erroneous start of the vehicle. This eliminates the conventional need for providing the hydraulic circuit with a pressure release circuit for preventing the erroneous start, thereby avoiding problems caused by the pressure release circuit, such as an increase in the size of the electric pump and an increase in power consumption.

Step S50 in FIG. 6A is shown in the flow of FIG. 6B. If the automatic transmission 1 is in the D-range in Step S51, the process proceeds to Step S52. If the automatic transmission 1 is not in the D-range, the process of FIG. 6B ends, and the process returns from Step S50 in the flow of FIG. 6A. Step S52 is repeatedly performed until the vehicle is stopped. If the vehicle is stopped, the process proceeds Step S53. In Step S53, the spool 103a of the manual valve 104 is in the D position. This maintains the hydraulic pressure in the hydraulic chamber of the low clutch 40, and the gap adjustment chamber 64 and the pressure chamber 65 of the L/R brake 60, thereby continuously engaging the low clutch 40 and the L/R brake 60 (reference characters α9, α10, and all of FIG. 7B).

Furthermore, in Step S54, a determination is made whether or not a condition for an automatic stop of the engine is satisfied based on, e.g., the vehicle speed, conditions of the brake and the accelerator. If such a predetermined automatic stop condition is satisfied, the control unit 200 outputs a signal for stopping the engine to, e.g., the fuel supply device 211 and the ignition device 212 of the engine. In Step S55, the engine is automatically stopped, i.e., the engine enters the idle stop state.

At that time, the mechanical pump 102 is stopped. In Step S56, the motor 101*a* of the electric pump 101 receives an operation signal, and the electric pump 101 starts its operation. In Step S57, switching the operating pumps allows the spool 103*a* of the pump switching valve 103 to move to the first position (right side), thereby making a transition to a state shown in Step S58. Specifically, in this state, the hydraulic pressure generated by the electric pump 101 is supplied to the hydraulic chamber of the low clutch 40 through the first input line 111, the pump switching valve 103, the low clutch line 115, and the first LSV 105, and is also supplied to the gap adjustment chamber 64 of the L/R brake 60 through the second input line 112, the pump switching valve 103, and the gap adjustment line 116. On the other hand, the stop of the engine stops supplying the hydraulic pressure through the pressure line 117, and the second LSV 106 releases the hydraulic pressure from the pressure chamber 65 of the L/R brake 60, thereby disengaging the L/R brake 60 (reference character α12).

The low clutch 40 is continuously engaged. In this L/R brake 60, the hydraulic pressure is supplied to the gap adjustment chamber 64 with the hydraulic pressure released from the pressure chamber 65. As a result, the L/R brake 60 enters the prepared-for-engagement state illustrated in FIG. 3B.

Next, in Step S59, a determination is made whether or not the automatic transmission 1 has switched from the D-range to the N-range. If this switch has not been made, a determination is made whether or not a condition for a restart is satisfied in Step S516. If the condition for the restart is not satisfied in Step S516, the process returns to Step S59. On the other hand, if the condition for the restart is satisfied in Step S516, the engine is automatically restarted according to Steps S517-S519. Besides, the spool 103*a* of the pump switching valve 103 moves to the second position again, and the hydraulic pressure generated by the mechanical pump 102 that has started operating is supplied to the hydraulic chamber of the low clutch 40, and to the gap adjustment chamber 64 and the pressure chamber 65 of the L/R brake 60. In Step S515, the electric pump 101 is stopped.

In this manner, the hydraulic pressure generated by the mechanical pump 102 allows for engaging the low clutch 40 and the L/R brake 60, and the vehicle is ready to start in the first gear position. Since the L/R brake 60 has been in the prepared-for-engagement state in advance as stated above, the L/R brake 60 is engaged simultaneously with the supply of the hydraulic pressure to the pressure chamber 65.

If a switch is made to the N-range in Step S59, the process proceeds to Step S510, and a determination is made whether or not the battery charge level is reduced to the predetermined value or less. If it is reduced to the predetermined value or less, i.e., the system of the engine is restarted, the first LSV 105 releases the hydraulic pressure supplied to the hydraulic chamber of the low clutch 40 through the low clutch line 115 in Step S511. Then, the engine is automatically restarted in Step S512. Accordingly, the engine is restarted with the low clutch 40 disengaged, and the vehicle is not erroneously started when the automatic transmission 1 is in the N-range.

Thereafter, the spool 103*a* of the pump switching valve 103 again moves to the second position in Steps S513 and S514 in association with the restart of the engine, and the pump supplying the hydraulic pressure to the gap adjustment chamber 64 of the L/R brake 60 switches from the electric pump 101 to the mechanical pump 102. Then, the electric pump 101 is stopped in Step S515.

If the first LSV 105 releases the hydraulic pressure supplied to the hydraulic chamber of the low clutch 40 in Step S511, the first LSV 105 may become inoperable with the input port i and the output port j communicating with each other due to the open failure of the first LSV 105. In such a situation, the hydraulic pressure supplied to the hydraulic chamber of the low clutch 40 cannot be released from the drain port k of the first LSV 105, and the low clutch 40 cannot be disengaged (the reference character α13).

Accordingly, if the L/R brake 60 were also engaged, the vehicle would be erroneously started in the N-range at the time of restart of the system of the engine in Step S16. However, the L/R brake 60 is maintained in the above-described prepared-for-engagement state, i.e., the state where the pressure piston 63 is in contact with the friction plates 68 without pressing the friction plates 68. This does not allow the power transmission path of the automatic transmission 1 to be in the state of the first gear position even if the low clutch 40 is not disengaged due to the open failure of the first LSV 105. Thus, the vehicle is not started even if the engine is started.

Accordingly, as illustrated in FIG. 10, the hydraulic pressure is supplied to all the pressure chamber of the low clutch 40, the pressure chamber 65 and the gap adjustment chamber 64 of the L/R brake 60 during the engine operation in the D-range (Steps S12, S53, and S519). On the other hand, during the automatic stop of the engine, the hydraulic pressure is supplied to the pressure chamber of the low clutch 40, and the gap adjustment chamber 64 of L/R brake 60, whereas the hydraulic pressure is not supplied to the pressure chamber 65 of L/R brake 60 (Step S58). In the N-range, during an engine operation, the hydraulic pressure is supplied to the gap adjustment chamber 64 of the L/R brake 60, and the hydraulic pressure is not supplied to the pressure chamber of the low clutch 40 and the pressure chamber 65 of the L/R brake 60 (Steps S3, S18, and S514). On the other hand, during the automatic stop of the engine, the hydraulic pressure is supplied to the pressure chamber of the low clutch 40 and the gap adjustment chamber 64 of the L/R brake 60, whereas the hydraulic pressure is not supplied to the pressure chamber 65 of the L/R brake 60 (Step S8).

Next, a second operation example in this embodiment will be described in accordance with flowcharts of FIGS. 8A and 8B, and timing charts of FIGS. 9A and 9B.

Figure 8A:
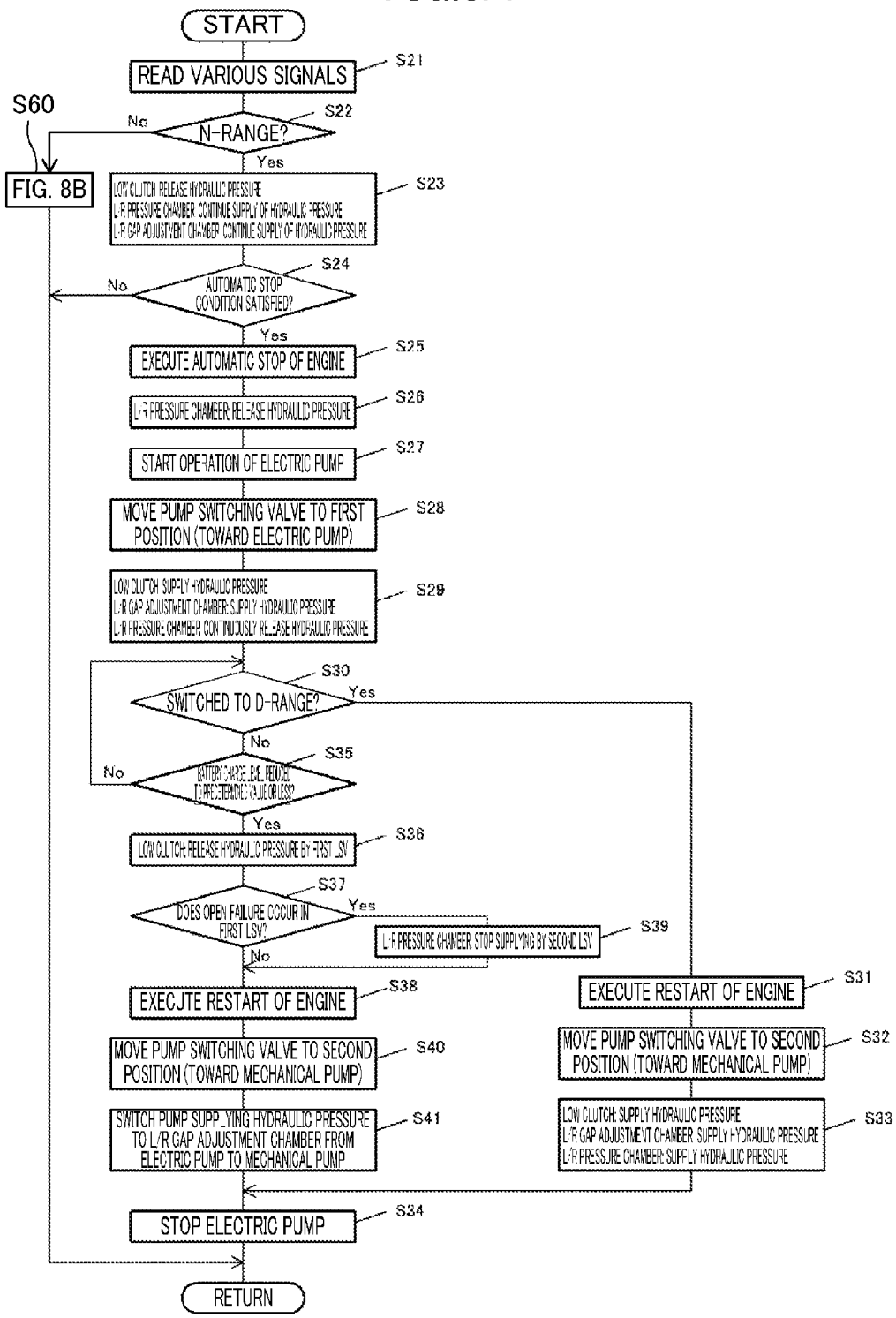
FIG. 8A is a part of a flowchart showing a second operation example of the engine and the automatic transmission when the engine is automatically stopped.
Figure 9A:
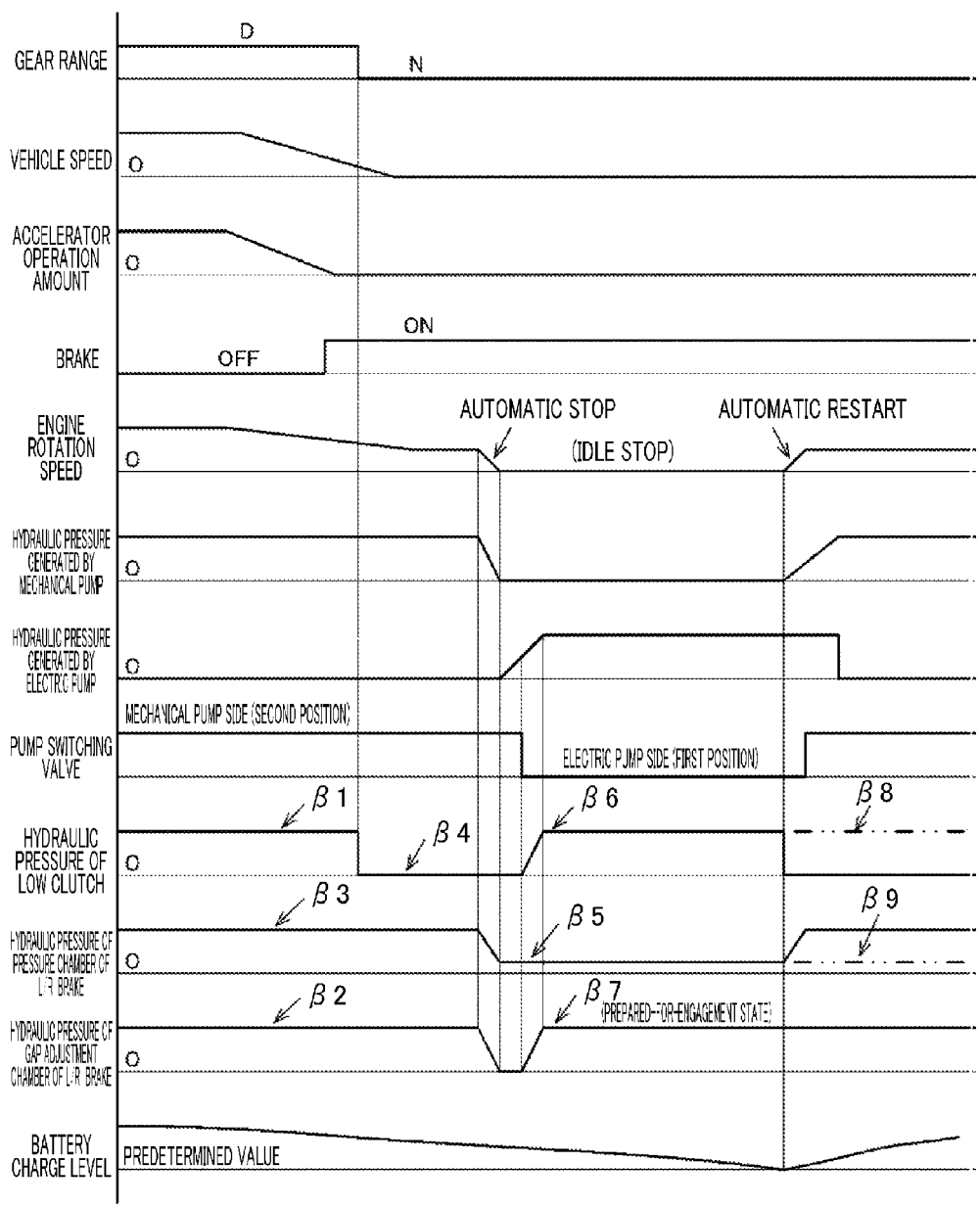
FIG. 9A is a timing chart showing the second operation example.
Figure 9B:
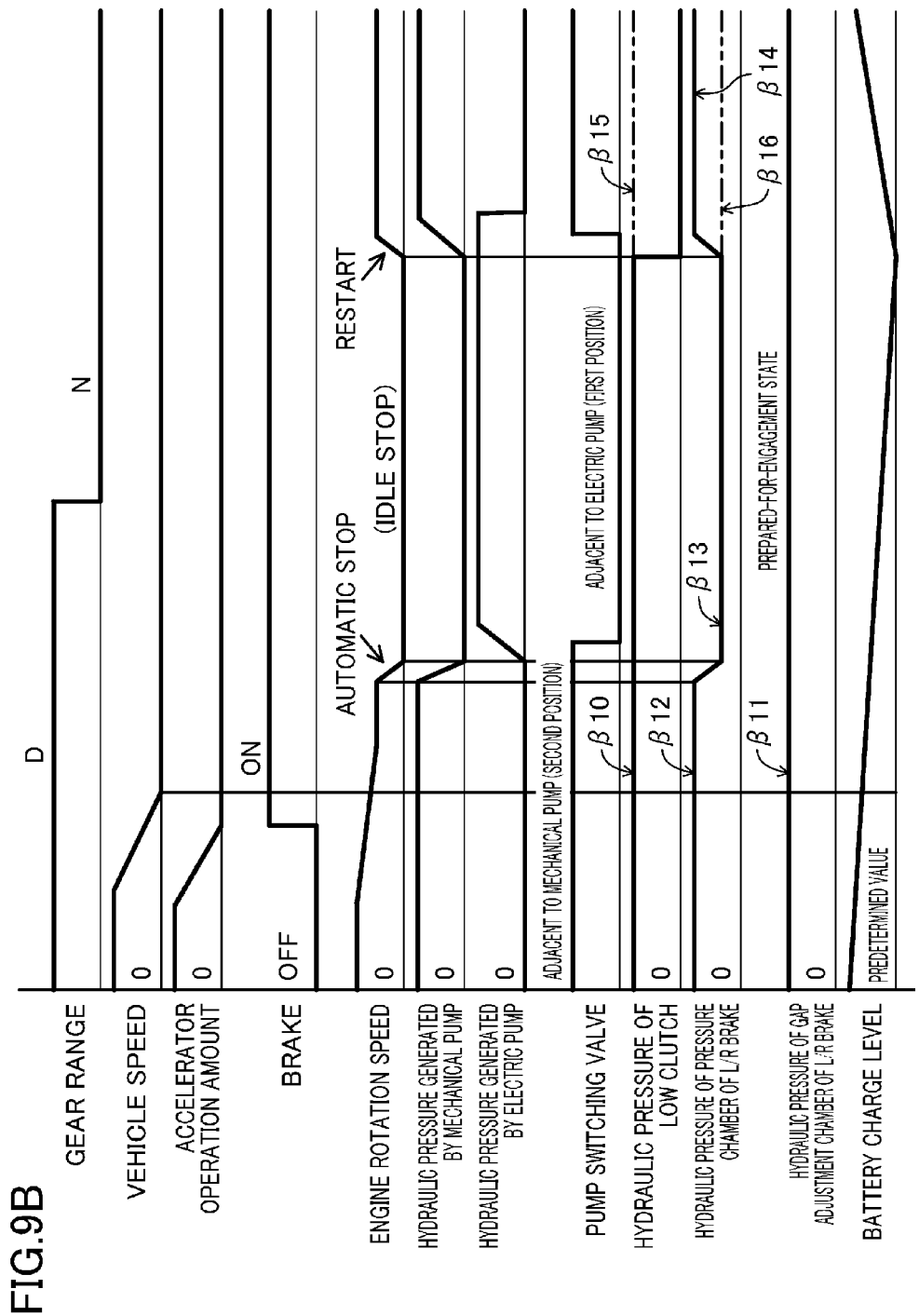
FIG. 9B is another timing chart showing the second operation example.

In Step S21 of the flowchart of FIG. 8A, various signals are first input from the switch and the sensors 201-207 illustrated in FIG. 5. In Step S22, a determination is made whether or not the current range of the automatic transmission 1 is the N-range.

When the vehicle is being stopped, the automatic transmission 1 is in the D-range. When the engine is not automatically stopped yet, the spool 103*a* of the pump switching valve 103 in the hydraulic circuit 100 of FIG. 4 is in the second position as well as in the first operation example, and the hydraulic pressure generated by the mechanical pump 102 driven by the engine is supplied to the hydraulic chamber of the low clutch 40 through the manual valve 104, the third input line 113, the pump switching valve 103, the low clutch line 115, and the first LSV 105. This allows for engaging the clutch 40 (see the reference character (31 of FIG. 9A).

The hydraulic pressure generated by the mechanical pump 102 is supplied to the gap adjustment chamber 64 of the L/R brake 60 through the fourth input line 114, the pump switching valve 103, and the gap adjustment line 116, and is also supplied to the pressure chamber 65 of the L/R brake 60 through the pressure line 117 branching from the third input line 113, the second LSV 106, and the L/R shift valve 107. This allows for engaging the L/R brake 60 (reference characters β2 and β3).

If the automatic transmission 1 is still in the D-range in this state, the process proceeds jumps from Step S22 in FIG. 8A to Step S60. The control in Step S60 will be described later. On the other hand, if the range of automatic transmission 1 switches to the N-range, the process proceeds from Step S22 to Step S23 in FIG. 8A. Specifically, the spool 103a of the manual valve 104 moves to the N position, and the low clutch line 115 is drained. This allows for releasing the hydraulic pressure from the hydraulic chamber of the low clutch 40, thereby disengaging the low clutch 40 (reference character (34).

At that time, in this operation example, the pressure line 117 is not drained by the manual valve 104. The hydraulic pressure generated by the mechanical pump 102 is supplied to the gap adjustment chamber 64 and the pressure chamber 65 of the L/R brake 60, and the L/R brake 60 is continuously engaged. This is performed to allow an immediate start of the vehicle when a switch is made from the N-range to the R-range to start the vehicle in the reverse gear position.

Next, in Step S24, a determination is made whether or not a condition for an automatic stop of the engine is satisfied based on, e.g., the vehicle speed, conditions of the brake and the accelerator. If a predetermined automatic stop condition is satisfied, the control unit 200 outputs a signal for stopping the engine to, e.g., the fuel supply device 211 and the ignition device 212 of the engine. In Step S25, the engine is automatically stopped, i.e., the engine enters the idle stop state. At that time, the mechanical pump 102 is stopped. In Step S26, the hydraulic pressure supplied to the pressure chamber 65 of the L/R brake 60 is released or reduced, thereby disengaging the L/R brake 60 (reference character β5).

On the other hand, in Step S27, the motor 101a of the electric pump 101 receives an operation signal and the electric pump 101 starts its operation. In Step S57, switching operating pumps allows the spool 103a of the pump switching valve 103 to move to the first position, thereby making a transition to a state shown in Step S29. Specifically, in this state, the hydraulic pressure generated by the electric pump 101 is supplied to the hydraulic chamber of the low clutch 40 through the first input line 111, the pump switching valve 103, the low clutch line 115, and the first LSV 105, and is also supplied to the gap adjustment chamber 64 of the L/R brake 60 through the second input line 112, the pump switching valve 103, and the gap adjustment line 116.

This allows for engaging the low clutch 40 again, and causes an increase in the hydraulic pressure that once reduced at the time of stop of the mechanical pump 102 (reference characters β6 and β7). At that time, in the L/R brake 60, the hydraulic pressure is supplied to the gap adjustment chamber 64 whereas the hydraulic pressure is continuously released from the pressure chamber 65. Therefore, the L/R brake 60 is in the prepared-for-engagement state illustrated in FIG. 3B.

Next, in Step S30, a determination is made whether or not the automatic transmission 1 has switched from the N-range to the D-range. If this switch has been made, the engine is automatically restarted according to Steps S31-S33. Besides, the spool 103a of the pump switching valve 103 moves to the second position, again, and the hydraulic pressure generated by the mechanical pump 102 that has started its operation is supplied to the hydraulic chamber of the low clutch 40, and the gap adjustment chamber 64 and the pressure chamber 65 of the L/R brake 60. In Step S34, the electric pump 101 is stopped.

In this manner, the hydraulic pressure generated by the mechanical pump 102 allows for engaging the low clutch 40 and the L/R brake 60, and the vehicle is ready to start. Since the L/R brake 60 has been in the prepared-for-engagement state in advance as stated above, this engagement is performed simultaneously with the supply of the hydraulic pressure to the pressure chamber 65. Accordingly, when a switch is made to the D-range, a smooth start-up of the vehicle can be obtained.

On the other hand, before the automatic transmission 1 is switched to the D-range, a determination is made whether or not the battery charge level is reduced to the predetermined value or less in Step S35. If it is reduced to the predetermined value or less, i.e., the system of the engine is restarted, the first LSV 105 releases the hydraulic pressure supplied to the hydraulic chamber of the low clutch 40 through the low clutch line 115 in Step S36, thereby disengaging the low clutch 40.

In this situation, in Step S37, a determination is made whether or not an open failure has occurred in the first LSV 105. If the open failure has not occurred, i.e., the hydraulic pressure supplied to the hydraulic chamber of the low clutch 40 is released and the low clutch 40 is disengaged, the engine is automatically restarted in Step S38. Accordingly, in this case, the engine is restarted with the low clutch 40 disengaged. This prevents an erroneous start of the vehicle in the N-range.

On the other hand, if a determination is made that an open failure has occurred in the first LSV 105 in Step S37, and the hydraulic pressure supplied to the hydraulic chamber of the low clutch 40 is not released (reference character β8), the second LSV 106 stops supplying the hydraulic pressure to the pressure chamber 65 of the L/R brake 60 from the mechanical pump 102 in the subsequent Step S39. Then, the engine is automatically restarted in Step S38.

Thus, in this situation, even if the restart of the engine allows the mechanical pump 102 to generate the hydraulic pressure, this pressure is not supplied to the pressure chamber 65 of the L/R brake 60, and the L/R brake 60 is continuously disengaged (reference character β9). This prevents an erroneous start of the vehicle at the time of engine restart in the N-range even if the low clutch 40 is not disengaged due to the open failure of the first LSV 105.

Thereafter, in either situation, the spool 103a of the pump switching valve 103 again moves to the second position in Steps S40 and S41, and the pump supplying the gap adjustment chamber 64 of the L/R brake 60 with the hydraulic pressure switches from the electric pump 101 to the mechanical pump 102. Then, the electric pump 101 is stopped in Step S34.

Figure 8B:
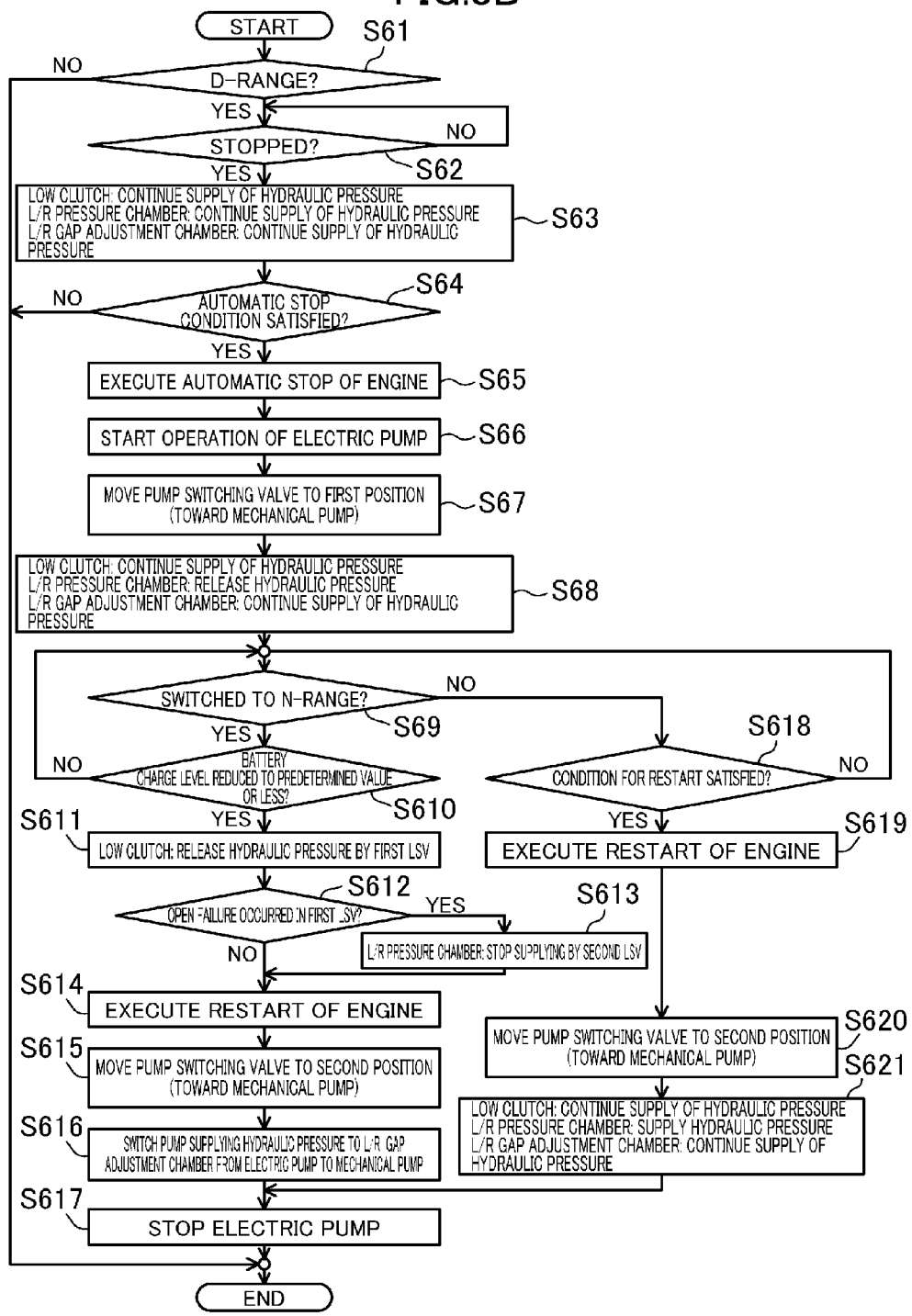
FIG. 8B is another part of the flowchart showing the second operation example of the engine and the automatic transmission when the engine is automatically stopped.

Step S60 in FIG. 8A is shown in the flow of FIG. 8B. If the automatic transmission 1 is in the D-range in Step S61, the process proceeds to Step S62. If the automatic transmission 1 is not in the D-range, the process of FIG. 8B ends, and the process returns from Step S60 in the flow of FIG. 8A. Step S62 is repeatedly performed until the vehicle is stopped. If the vehicle is stopped, the process proceeds Step S63. In Step S63, the spool of the manual valve 104 is in the D position. This maintains the hydraulic pressure in the hydraulic chamber of the low clutch 40, and the gap adjustment chamber 64 and the pressure chamber 65 of the L/R brake 60, thereby continuously engaging the low clutch 40 and the L/R brake 60 (reference characters β10, β11, and β12 of FIG. 9B).

Furthermore, in Step S64, a determination is made whether or not a condition for an automatic stop of the engine is satisfied based on, e.g., the vehicle speed, conditions of the brake and the accelerator. If such a predetermined automatic stop condition is satisfied, the control unit 200 outputs a signal for stopping the engine to, e.g., the fuel supply device 211 and the ignition device 212 of the engine. In Step S65, the engine is automatically stopped, i.e., the engine enters the idle stop state.

At that time, the mechanical pump 102 is stopped. In Step S66, the motor 101a of the electric pump 101 receives an operation signal, and the electric pump 101 starts its operation. In Step S67, switching the operating pumps allows the spool 103a of the pump switching valve 103 to move to the first position (right side), thereby making a transition to a state shown in Step S68. Specifically, in this state, the hydraulic pressure generated by the electric pump 101 is supplied to the hydraulic chamber of the low clutch 40 through the first input line 111, the pump switching valve 103, the low clutch line 115, and the first LSV 105, and is also supplied to the gap adjustment chamber 64 of the L/R brake 60 through the second input line 112, the pump switching valve 103, and the gap adjustment line 116. On the other hand, the operation of the mechanical pump 102 is stopped, and the hydraulic pressure supplied to the pressure chamber 65 of the L/R brake 60 is released or reduced, thereby disengaging the L/R brake 60 (reference character β13).

The low clutch 40 is continuously engaged. In this L/R brake 60, the hydraulic pressure is supplied to the gap adjustment chamber 64 with the hydraulic pressure released from the pressure chamber 65. As a result, the L/R brake 60 enters the prepared-for-engagement state illustrated in FIG. 3B.

Next, in Step S69, a determination is made whether or not the automatic transmission 1 has switched from the D-range to the N-range. If this switch has not been made, a determination is made whether or not a condition for a restart is satisfied in Step S618. If the condition for the restart is not satisfied in Step S618, the process returns to Step S69. On the other hand, if the condition for the restart is satisfied in Step S618, the engine is automatically restarted according to Steps S619-S621. Besides, the spool 103a of the pump switching valve 103 moves to the second position again, and the hydraulic pressure generated by the mechanical pump 102 that has started its operation is supplied to the hydraulic chamber of the low clutch 40, and to the gap adjustment chamber 64 and the pressure chamber 65 of the L/R brake 60. In Step S617, the electric pump 101 is stopped.

In this manner, the hydraulic pressure generated by the mechanical pump 102 allows for engaging the low clutch 40 and the L/R brake 60, and the vehicle is ready to start in the first gear position. Since the L/R brake 60 has been in the prepared-for-engagement state in advance as stated above, the L/R brake 60 is engaged simultaneously with the supply of the hydraulic pressure to the pressure chamber 65.

If a switch is made to the N-range in Step S69, the process proceeds to Step S610, and a determination is made whether or not the battery charge level is reduced to the predetermined value or less. If it is reduced to the predetermined value or less, i.e., the system of the engine is restarted, the first LSV 105 releases the hydraulic pressure supplied to the hydraulic chamber of the low clutch 40 through the low clutch line 115 in Step S611.

In this case, in Step S612, a determination is made whether or not an open failure has occurred in the first LSV 105. If the open failure has not occurred, i.e., the hydraulic pressure supplied to the hydraulic chamber of the low clutch 40 is released and the low clutch 40 is disengaged, the engine is automatically restarted in Step S614.

The restart of the engine allows the mechanical pump 102 to generate hydraulic pressure. Thereafter, the spool 103a of the pump switching valve 103 again moves to the second position in Steps S615 and S616 in association with the restart of the engine, and the pump supplying the hydraulic pressure to the gap adjustment chamber 64 of the L/R brake 60 switches from the electric pump 101 to the mechanical pump 102. Although the hydraulic pressure is also supplied to the pressure chamber 65 of the L/R brake 60 (reference character β14), the low clutch 40 is disengaged, thereby preventing an erroneous start of the vehicle in the N-range, as described above. Then, in Step S617, the electric pump 101 is stopped.

On the other hand, if a determination is made that the open failure has occurred in the first LSV 105 in Step S612, and the hydraulic pressure supplied to the hydraulic chamber of the low clutch 40 is not released (reference character β15), the second LSV 106 is controlled to stop supplying the hydraulic pressure to the pressure chamber 65 of the L/R brake 60 from the mechanical pump 102 in the subsequent Step S613. Then, the engine is automatically restarted in Step S614.

Thus, in this case, even if the restart of the engine allows the mechanical pump 102 to generate the hydraulic pressure, this pressure is not supplied to the pressure chamber 65 of the L/R brake 60, and the L/R brake 60 is continuously disengaged (reference character β16). This prevents an erroneous start of the vehicle at the time of the engine restart in the N-range even if the low clutch 40 is not disengaged due to the open failure of the first LSV 105.

Accordingly, as shown in FIG. 10, the second operation example is the same as the first one in the supply and release of the hydraulic pressure to and from the pressure chamber of the low clutch 40 and the pressure chamber 65 and the gap adjustment chamber 64 of the L/R brake 60 in the D-range. However, the second operation example is different from the first one in that, in the second operation example, the hydraulic pressure is supplied to the pressure chamber 65 of the L/R brake 60 during the engine operation in the N-range.

As can be seen in the foregoing, the operation according to the second operation example also avoids the problems, such as an increase in size of the electric pump and an increase in power consumption, caused by the pressure release circuit provided in the hydraulic passage between the electric pump and the hydraulic control valve for preventing the above-described erroneous start of the vehicle.

INDUSTRIAL APPLICABILITY

As can be seen from the foregoing description, the technique disclosed herein allows an automatic transmission, mounted in a vehicle to which idle stop control is applied to stop the engine, to ensure a smooth start of the vehicle when a switch is made from a non-traveling range to a traveling range. The technique disclosed herein also allows this automatic transmission to prevent an erroneous start of the vehicle in the non-traveling range at the time of restart of the system of the engine without increasing the size of the electric pump and electric power consumption. This technique thus may be appropriately used in industrial fields of manufacturing automatic transmissions of this type and vehicles mounting such transmissions.

DESCRIPTION OF REFERENCE CHARACTERS 1 automatic transmission
40 first frictional engagement element (low clutch)

60 second frictional engagement element (L/R brake)
64 gap adjustment chamber
65 pressure chamber
101 first hydraulic pressure generator (electric pump)
102 second hydraulic pressure generator (mechanical pump)
105 first hydraulic control valve (first LSV)
106 second hydraulic control valve (second LSV)
107 third hydraulic control valve (L/R shift valve)
111, 115 first hydraulic passage (first input line, low clutch line)
112, 116 second hydraulic passage (second input line, gap adjustment line)
117 third hydraulic passage (pressure line)
200 control unit

The invention claimed is:

1. An automatic transmission mounted in a vehicle to which idle stop control for an engine is applied such that the engine is automatically stopped when a predetermined stop condition is satisfied, and the engine is automatically restarted when a predetermined restart condition is satisfied during the automatic stop of the engine, the automatic transmission switching between a traveling range and a non-traveling range in response to an operation by the vehicle's operator, the automatic transmission comprising:
a first frictional engagement element and a second frictional engagement element engaged when the vehicle is started in the traveling range;
two hydraulic chambers provided in the second frictional engagement element, and engaging the second frictional engagement element when a hydraulic pressure is supplied to the two hydraulic chambers;
a first hydraulic pressure generator generating the hydraulic pressure when the engine has been automatically stopped; and
a control unit controlling the hydraulic pressure in the first and second frictional engagement elements, wherein
the control unit supplies the hydraulic pressure generated by the first hydraulic pressure generator to the first frictional engagement element and one of the two hydraulic chambers of the second frictional engagement element when the automatic transmission is in the non-traveling range and the engine has been automatically stopped.

2. The automatic transmission of claim 1, wherein
the second frictional engagement element is engaged when the engine is operated in a reverse gear of the traveling range or in the non-traveling range,
the control unit releases the hydraulic pressure from the first frictional engagement element and supplies the hydraulic pressure to the two hydraulic chambers of the second frictional engagement element when the transmission is in the non-traveling range and the engine automatically stopped is restarted, and
the control unit continuously supplies the hydraulic pressure to one of the two hydraulic chambers of the second frictional engagement element in a situation where the control unit is unable to release the hydraulic pressure from the first frictional engagement element when the transmission is in the non-traveling range and the engine automatically stopped is restarted.

3. The automatic transmission of claim 2, wherein
the control unit supplies the hydraulic pressure generated by the first hydraulic pressure generator to the first frictional engagement element and one of the two hydraulic chambers of the second frictional engagement element when the transmission is in the traveling range and the engine has been automatically stopped.

4. The automatic transmission of claim 3, further comprising:
a first hydraulic control valve having an input port, an output port, and a drain port;
a first hydraulic passage provided so as to allow the first hydraulic pressure generator to communicate with the hydraulic chamber of the first frictional engagement element through the input port and the output port of the first hydraulic control valve, and capable of releasing the hydraulic pressure supplied to the hydraulic chamber from only the drain port of the first hydraulic control valve; and
a second hydraulic passage allowing the first hydraulic pressure generator to communicate with one of the two hydraulic chambers of the second frictional engagement element.

5. The automatic transmission of claim 4, wherein
the two hydraulic chambers of the second frictional engagement element serve as a pressing hydraulic chamber pressing friction plates of the second frictional engagement element with a pressure piston when the two hydraulic chambers are supplied with the hydraulic pressure, and a gap adjustment hydraulic chamber reducing a gap between the pressure piston and the friction plates when the two hydraulic chambers are supplied with the hydraulic pressure, and
the second hydraulic passage allows the first hydraulic pressure generator to communicate with the gap adjustment hydraulic chamber.

6. The automatic transmission of claim 5, further comprising:
a second hydraulic pressure generator driven by the engine and generating a hydraulic pressure;
a third hydraulic passage allowing the second hydraulic pressure generator to communicate with the pressing hydraulic chamber of the second frictional engagement element; and
a second hydraulic control valve provided in the third hydraulic passage, and capable of releasing the hydraulic pressure supplied to the pressing hydraulic chamber of the second frictional engagement element in a situation where the first hydraulic control valve becomes unable to release the hydraulic pressure supplied to the first frictional engagement element when the transmission is in the non-traveling range and the engine is restarted automatically.

7. The automatic transmission of claim 6, further comprising
a third hydraulic control valve provided between the second hydraulic control valve in the third hydraulic passage and the pressing hydraulic chamber of the second frictional engagement element, and is able to switch between a first state where the second hydraulic control valve communicates with the pressure hydraulic chamber and a second state where there is no communication between the second hydraulic control valve and the pressure hydraulic chamber, wherein
the third hydraulic control valve is configured to switch to the first state if the hydraulic pressure is supplied to the gap adjustment hydraulic chamber through the second hydraulic passage.

8. The automatic transmission of claim 2, further comprising:
a first hydraulic control valve having an input port, an output port, and a drain port;

a first hydraulic passage provided so as to allow the first hydraulic pressure generator to communicate with the hydraulic chamber of the first frictional engagement element through the input port and the output port of the first hydraulic control valve, and capable of releasing the hydraulic pressure supplied to the hydraulic chamber from only the drain port of the first hydraulic control valve; and a second hydraulic passage allowing the first hydraulic pressure generator to communicate with one of the two hydraulic chambers of the second frictional engagement element.

9. The automatic transmission of claim 8, wherein
the two hydraulic chambers of the second frictional engagement element serve as a pressing hydraulic chamber pressing friction plates of the second frictional engagement element with a pressure piston when the two hydraulic chambers are supplied with the hydraulic pressure, and a gap adjustment hydraulic chamber reducing a gap between the pressure piston and the friction plates when the two hydraulic chambers are supplied with the hydraulic pressure, and
the second hydraulic passage allows the first hydraulic pressure generator to communicate with the gap adjustment hydraulic chamber.

10. The automatic transmission of claim 9, further comprising:
a second hydraulic pressure generator driven by the engine and generating a hydraulic pressure;
a third hydraulic passage allowing the second hydraulic pressure generator to communicate with the pressing hydraulic chamber of the second frictional engagement element; and
a second hydraulic control valve provided in the third hydraulic passage, and capable of releasing the hydraulic pressure supplied to the pressing hydraulic chamber of the second frictional engagement element in a situation where the first hydraulic control valve becomes unable to release the hydraulic pressure supplied to the first frictional engagement element when the transmission is in the non-traveling range and the engine is restarted automatically.

11. The automatic transmission of claim 10, further comprising
a third hydraulic control valve provided between the second hydraulic control valve in the third hydraulic passage and the pressing hydraulic chamber of the second frictional engagement element, and is able to switch between a first state where the second hydraulic control valve communicates with the pressure hydraulic chamber and a second state where there is no communication between the second hydraulic control valve and the pressure hydraulic chamber, wherein
the third hydraulic control valve is configured to switch to the first state if the hydraulic pressure is supplied to the gap adjustment hydraulic chamber through the second hydraulic passage.

12. The automatic transmission of claim 1, wherein
the control unit supplies the hydraulic pressure generated by the first hydraulic pressure generator to the first frictional engagement element and one of the two hydraulic chambers of the second frictional engagement element when the transmission is in the traveling range and the engine has been automatically stopped.

13. The automatic transmission of claim 12, further comprising:
a first hydraulic control valve having an input port, an output port, and a drain port;
a first hydraulic passage provided so as to allow the first hydraulic pressure generator to communicate with the hydraulic chamber of the first frictional engagement element through the input port and the output port of the first hydraulic control valve, and capable of releasing the hydraulic pressure supplied to the hydraulic chamber from only the drain port of the first hydraulic control valve; and
a second hydraulic passage allowing the first hydraulic pressure generator to communicate with one of the two hydraulic chambers of the second frictional engagement element.

14. The automatic transmission of claim 13, wherein
the two hydraulic chambers of the second frictional engagement element serve as a pressing hydraulic chamber pressing friction plates of the second frictional engagement element with a pressure piston when the two hydraulic chambers are supplied with the hydraulic pressure, and a gap adjustment hydraulic chamber reducing a gap between the pressure piston and the friction plates when the two hydraulic chambers are supplied with the hydraulic pressure, and
the second hydraulic passage allows the first hydraulic pressure generator to communicate with the gap adjustment hydraulic chamber.

15. The automatic transmission of claim 14, further comprising:
a second hydraulic pressure generator driven by the engine and generating a hydraulic pressure;
a third hydraulic passage allowing the second hydraulic pressure generator to communicate with the pressing hydraulic chamber of the second frictional engagement element; and
a second hydraulic control valve provided in the third hydraulic passage, and capable of releasing the hydraulic pressure supplied to the pressing hydraulic chamber of the second frictional engagement element in a situation where the first hydraulic control valve becomes unable to release the hydraulic pressure supplied to the first frictional engagement element when the transmission is in the non-traveling range and the engine is restarted automatically.

16. The automatic transmission of claim 15, further comprising
a third hydraulic control valve provided between the second hydraulic control valve in the third hydraulic passage and the pressing hydraulic chamber of the second frictional engagement element, and is able to switch between a first state where the second hydraulic control valve communicates with the pressure hydraulic chamber and a second state where there is no communication between the second hydraulic control valve and the pressure hydraulic chamber, wherein
the third hydraulic control valve is configured to switch to the first state if the hydraulic pressure is supplied to the gap adjustment hydraulic chamber through the second hydraulic passage.

17. The automatic transmission of claim 1, further comprising:
a first hydraulic control valve having an input port, an output port, and a drain port;
a first hydraulic passage provided so as to allow the first hydraulic pressure generator to communicate with the hydraulic chamber of the first frictional engagement element through the input port and the output port of the first hydraulic control valve, and capable of releasing the hydraulic pressure supplied to the hydraulic chamber from only the drain port of the first hydraulic control valve; and a second hydraulic passage allowing the first hydraulic pressure generator to communicate with one of the two hydraulic chambers of the second frictional engagement element.

18. The automatic transmission of claim 17, wherein the two hydraulic chambers of the second frictional engagement element serve as a pressing hydraulic chamber pressing friction plates of the second frictional engagement element with a pressure piston when the two hydraulic chambers are supplied with the hydraulic pressure, and a gap adjustment hydraulic chamber reducing a gap between the pressure piston and the friction plates when the two hydraulic chambers are supplied with the hydraulic pressure, and the second hydraulic passage allows the first hydraulic pressure generator to communicate with the gap adjustment hydraulic chamber.

19. The automatic transmission of claim 18, further comprising:

a second hydraulic pressure generator driven by the engine and generating a hydraulic pressure;

a third hydraulic passage allowing the second hydraulic pressure generator to communicate with the pressing hydraulic chamber of the second frictional engagement element; and a second hydraulic control valve provided in the third hydraulic passage, and capable of releasing the hydraulic pressure supplied to the pressing hydraulic chamber of the second frictional engagement element in a situation where the first hydraulic control valve becomes unable to release the hydraulic pressure supplied to the first frictional engagement element when the transmission is in the non-traveling range and the engine is restarted automatically.

20. The automatic transmission of claim 19, further comprising a third hydraulic control valve provided between the second hydraulic control valve in the third hydraulic passage and the pressing hydraulic chamber of the second frictional engagement element, and is able to switch between a first state where the second hydraulic control valve communicates with the pressure hydraulic chamber and a second state where there is no communication between the second hydraulic control valve and the pressure hydraulic chamber, wherein the third hydraulic control valve is configured to switch to the first state if the hydraulic pressure is supplied to the gap adjustment hydraulic chamber through the second hydraulic passage.

21. An automatic transmission mounted in a vehicle to which idle stop control for an engine is applied such that the engine is automatically stopped when a predetermined stop condition is satisfied, and the engine is automatically restarted when a predetermined restart condition is satisfied during the automatic stop of the engine, the automatic transmission switching between a traveling range and a non-traveling range in response to an operation of a vehicle's operator, the automatic transmission comprising:

a first frictional engagement element and a second frictional engagement element engaged when the vehicle is started in the traveling range;

two hydraulic chambers provided in the second frictional engagement element, and engaging the second frictional engagement element when a hydraulic pressure is supplied to the two hydraulic chambers;

a first hydraulic pressure generator generating the hydraulic pressure when the engine has been automatically stopped; and a control unit controlling the hydraulic pressure in the first and second frictional engagement elements, wherein the control unit supplies the hydraulic pressure generated by the first hydraulic pressure generator to the first frictional engagement element and one of the two hydraulic chambers of the second frictional engagement element when the automatic transmission is in the non-traveling range and the engine has been automatically stopped such that erroneous start of the vehicle is prevented even in a situation where the first frictional engagement element is unable to be disengaged when the automatic transmission is in the non-traveling range and the engine is being automatically restarted.

* * * * *